US008739226B2

(12) United States Patent
Hanabusa

(10) Patent No.: US 8,739,226 B2
(45) Date of Patent: May 27, 2014

(54) WIRELESS TELEVISION SYSTEM

(75) Inventor: Toshio Hanabusa, Kawasaki (JP)

(73) Assignee: Casio Computer Co., Ltd., Tokyo (JP)

( * ) Notice: Subject to any disclaimer, the term of this patent is extended or adjusted under 35 U.S.C. 154(b) by 89 days.

(21) Appl. No.: 13/182,288

(22) Filed: Jul. 13, 2011

(65) Prior Publication Data

US 2011/0271305 A1 Nov. 3, 2011

Related U.S. Application Data

(62) Division of application No. 11/542,171, filed on Oct. 3, 2006, now Pat. No. 8,005,117.

(30) Foreign Application Priority Data

Oct. 5, 2005 (JP) .................................. 2005-291939

(51) Int. Cl.
*H04N 7/16* (2011.01)
(52) U.S. Cl.
USPC .............................. 725/62; 725/131; 725/139
(58) Field of Classification Search
CPC .............. H04N 21/40; H04N 21/6181; H04N 21/42221
USPC ............................................ 455/188; 725/78
See application file for complete search history.

(56) References Cited

U.S. PATENT DOCUMENTS

| 5,875,396 | A | 2/1999 | Stockton et al. |
| 6,373,861 | B1 | 4/2002 | Lee |
| 7,006,805 | B1 * | 2/2006 | Sorrells et al. ............. 455/188.1 |
| 7,089,321 | B2 | 8/2006 | Hayashi |
| 7,133,352 | B1 | 11/2006 | Hadad |
| 7,411,894 | B2 | 8/2008 | Ro et al. |
| 7,565,674 | B2 * | 7/2009 | Motoe et al. .................... 725/81 |
| 7,653,415 | B2 | 1/2010 | van Rooyen |
| 2004/0125777 | A1 * | 7/2004 | Doyle et al. .................. 370/338 |
| 2006/0126491 | A1 | 6/2006 | Ro et al. |

FOREIGN PATENT DOCUMENTS

| JP | 2002-198957 A | 7/2002 |
| JP | 2003-224739 A | 8/2003 |
| JP | 2005-012583 A | 1/2005 |
| WO | WO 2004064415 A2 * | 7/2004 |

OTHER PUBLICATIONS

Japanese Office Action dated Feb. 23, 2011 (and English translation thereof) in counterpart Japanese Application No. 2005-291939.

* cited by examiner

*Primary Examiner* — Benjamin R Bruckart
*Assistant Examiner* — Anthony Bantamoi
(74) *Attorney, Agent, or Firm* — Holtz Holtz Goodman & Chick PC

(57) ABSTRACT

A wireless television system includes a transmitting device that transmits by wireless transmission a digital broadcast signal obtained by receiving a digital broadcast of a plurality of channels, and a wireless television receiver. The wireless television receiver can directly receive the digital broadcast, and can receive a digital broadcast signal carried in a LAN signal transmitted by the transmitting device. The wireless television receiver compares received levels and error rates of a digital broadcast signal received directly, and digital broadcast signals of a same channel as that of the digital broadcast signal received directly. based on a result of the comparison, the wireless television receiver selects and outputs a digital broadcast signal with a highest received level or a lowest error rate from among the plurality of digital broadcast signals of the same channel.

4 Claims, 30 Drawing Sheets

FIG. 3

| TRANSMITTING DEVICE | ① 2.4GHz MULTIPLE TELEVISION CHANNEL COMMUNICATION MODE | SIMULTANEOUSLY TRANSMITS THREE TELEVISION CHANNELS USING THREE 2.4GHz CHANNELS |
|---|---|---|
| | ② 2.4GHz SINGLE TELEVISION CHANNEL COMMUNICATION MODE | SIMULTANEOUSLY TRANSMITS ONE TELEVISION CHANNEL USING THREE 2.4GHz CHANNELS |

| WIRELESS TELEVISION RECEIVER | ① 2.4GHz MULTIPLE TELEVISION CHANNEL COMMUNICATION MODE (MAINLY USED INDOORS) | COMPARES TELEVISION WAVE OF 2.4GHz CANNEL AND DIRECTLY RECEIVED TELEVISION WAVE AND AUTOMATICALLY SELECTS TELEVISION WAVE WITH HIGHER RECEPTION SENSITIVITY (CORRESPONDS TO 2.4GHz MULTIPLE TELEVISION CHANNEL COMMUNICATION MODE OF TRANSMITTING DEVICE) |
|---|---|---|
| | ② 2.4GHz SINGLE TELEVISION CHANNEL COMMUNICATION MODE (MAINLY USED INDOORS) | RELATES TO ONE TELEVISION CHANNEL. COMPARES PLURAL 2.4G Hz CHANNELS AND DIRECTLY RECEIVED TELEVISION CHANNEL AND AUTOMATICALLY SELECTS CHANNEL WITH HIGHER RECEPTION SENSITIVITY (CORRESPONDS TO 2.4GHz SINGLE TELEVISION CHANNEL COMMUNICATION MODE OF TRANSMITTING DEVICE) |
| | ③ UHF RECEIVE ONLY MODE (MAINLY USED OUTDOORS) | RECEIVES ONLY UHF TELEVISION CHANNELS (RECEPTION USING 2.4GHz BAND IS TURNED OFF) |

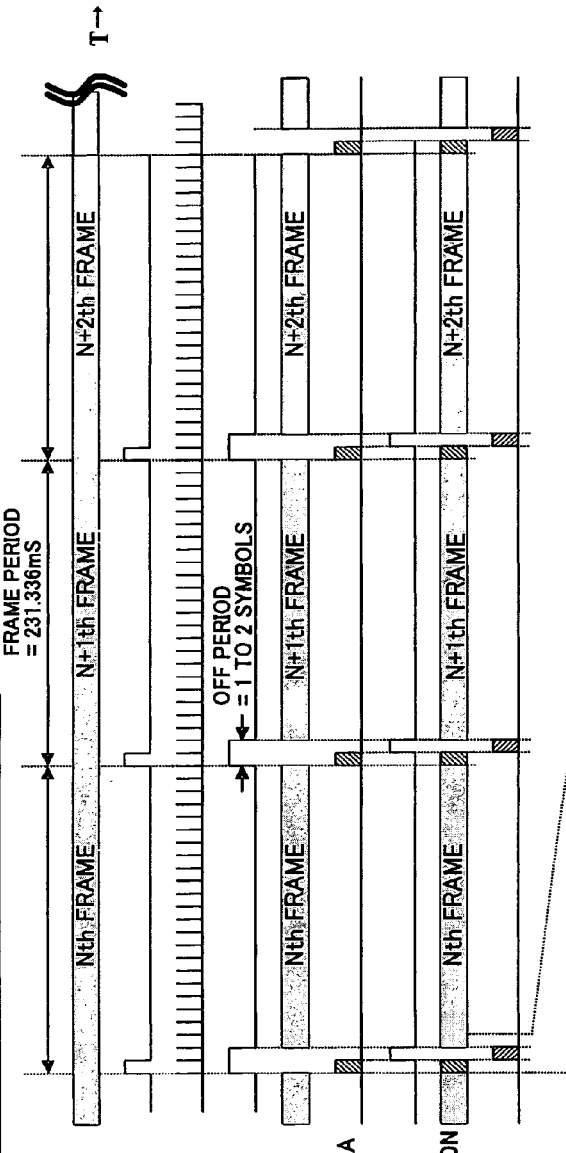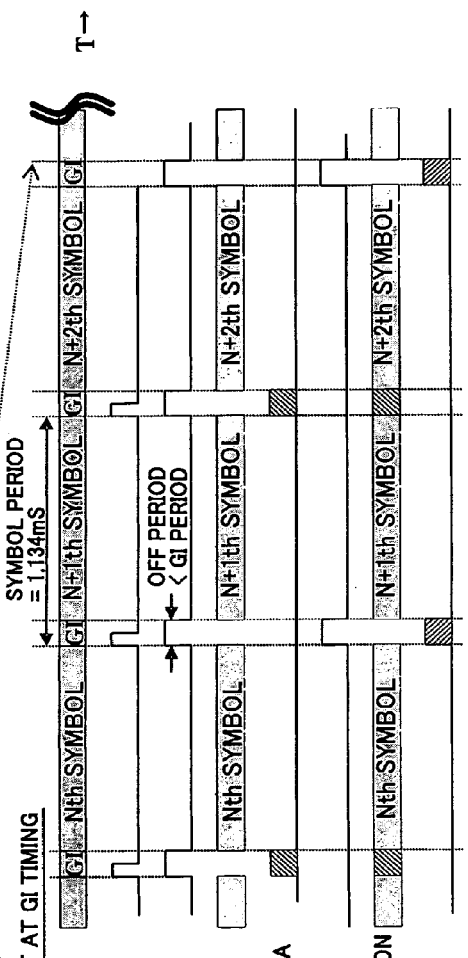
FIG. 22A
FIG. 22B

FIG. 25A  TRANSMITTING DEVICE 100
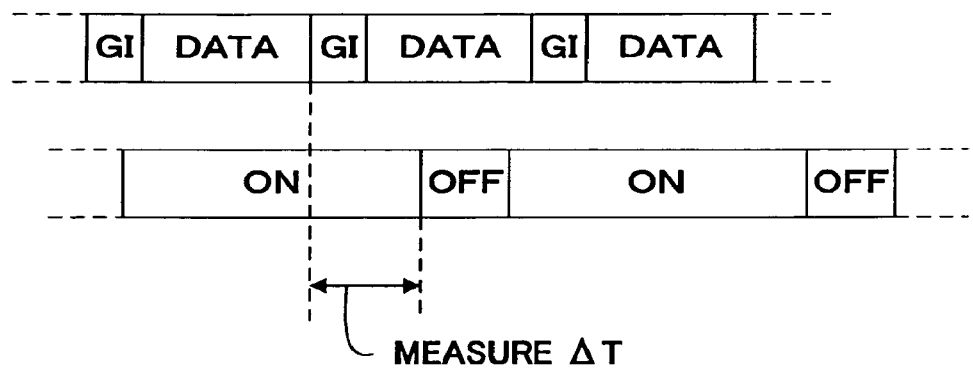
FIG. 25B  WIRELESS TELEVISION RECEIVER 200
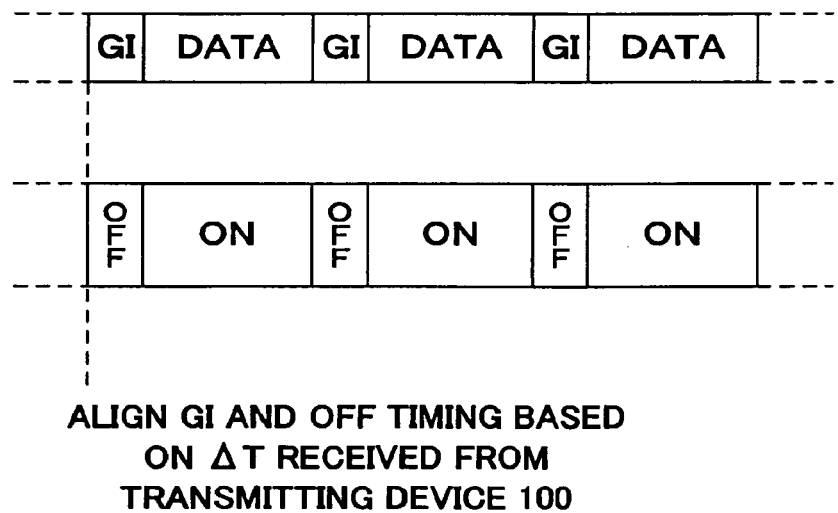
ALIGN GI AND OFF TIMING BASED
ON ΔT RECEIVED FROM
TRANSMITTING DEVICE 100

FIG.26
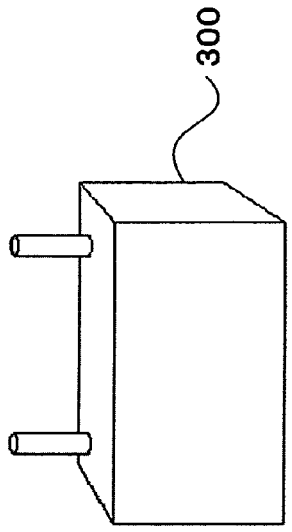
OUTLINE VIEW
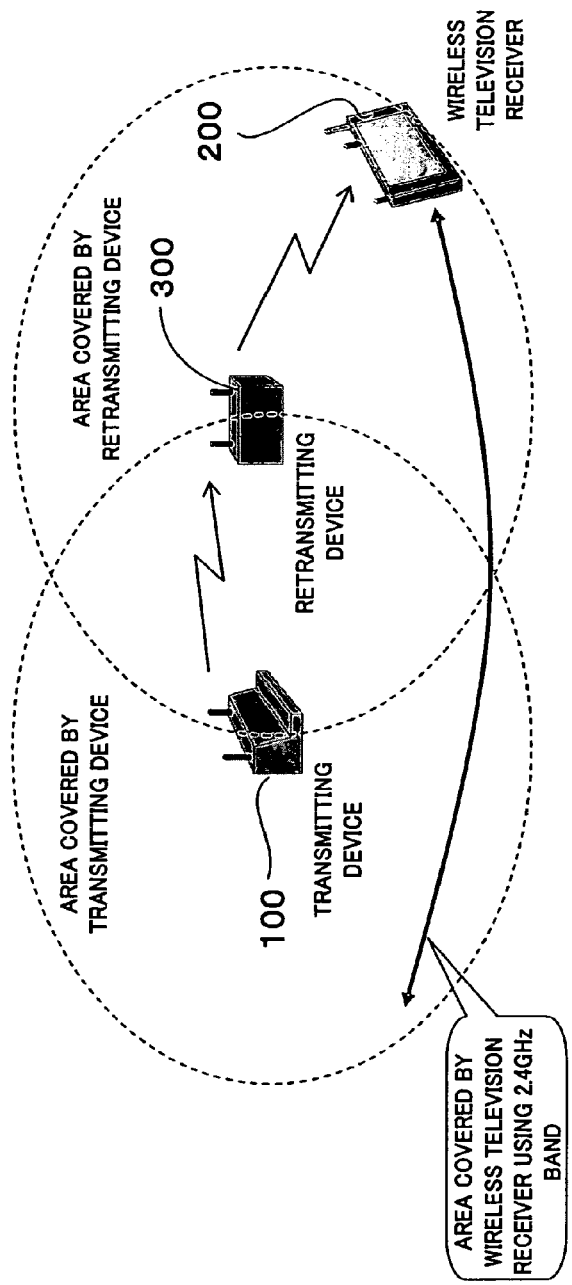
DIAGRAM OF RETRANSMITTING DEVICE OPERATION

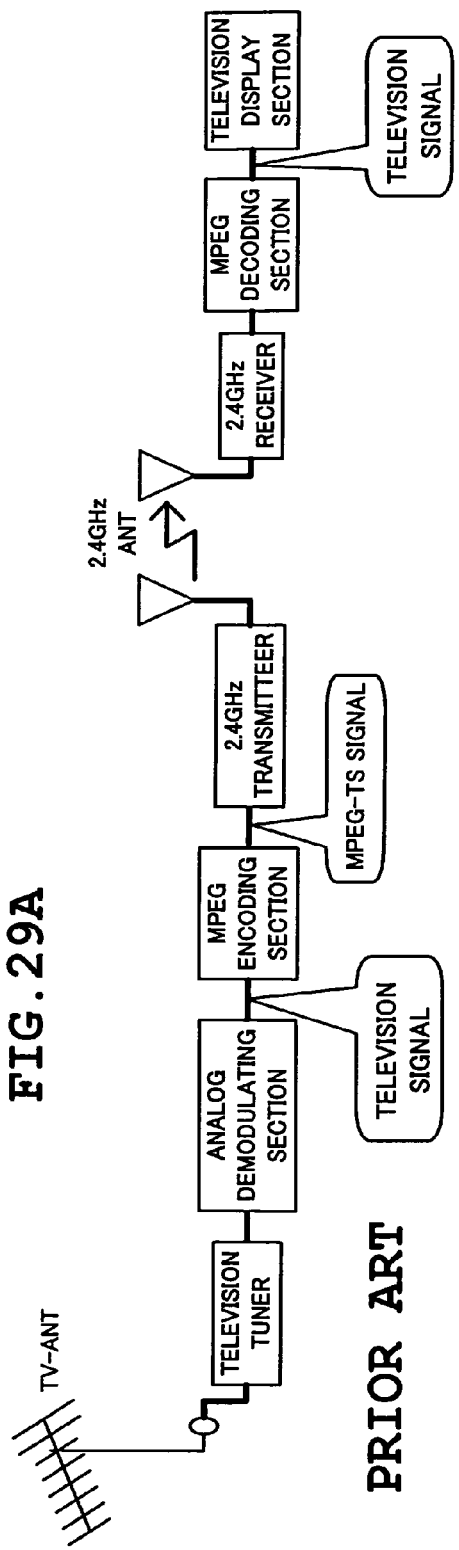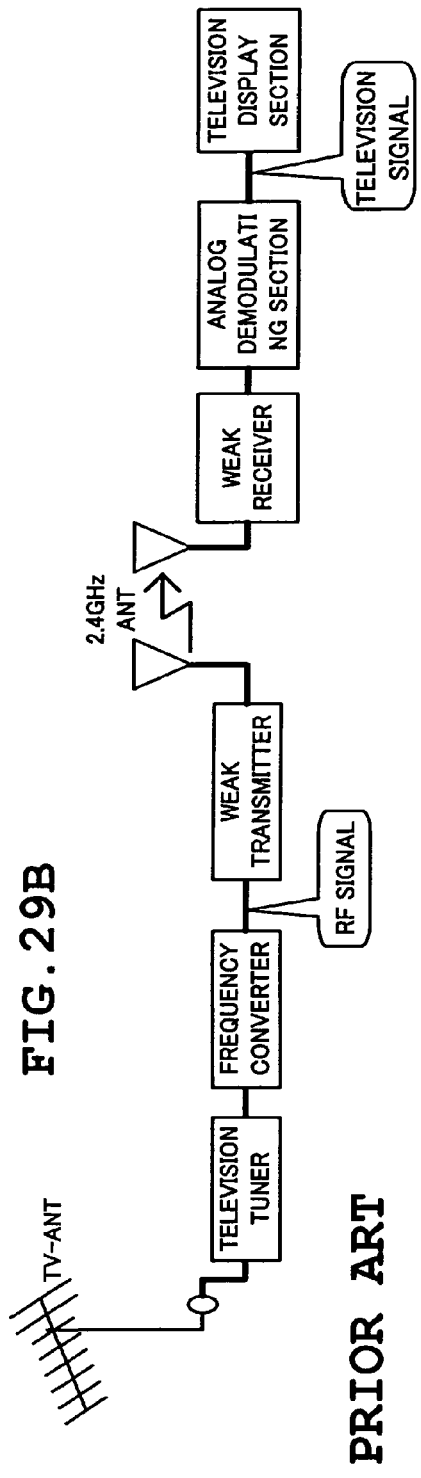
FIG. 29A PRIOR ART
FIG. 29B PRIOR ART

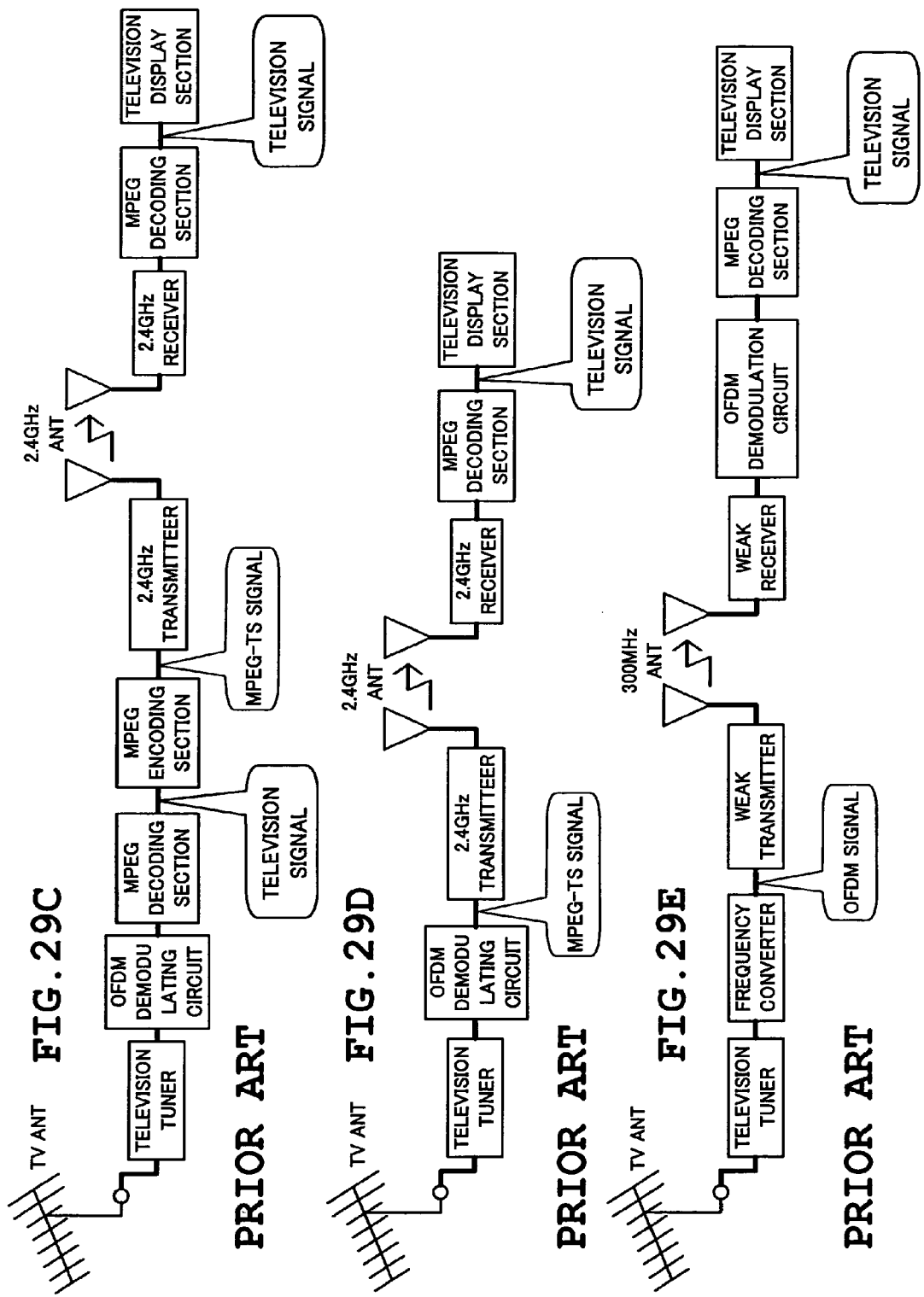

WIRELESS TELEVISION SYSTEM

CROSS-REFERENCE TO RELATED APPLICATION

This application is a Divisional Application of U.S. application Ser. No. 11/542,171 filed Oct. 3, 2006 now U.S. Pat. No. 8,005,117, which application is based upon and claims the benefit of priority from the prior Japanese Patent Application No. 2005-291939, filed Oct. 5, 2005, the entire contents of both of which are incorporated herein by reference.

BACKGROUND OF THE INVENTION

1. Field of the Invention

The present invention relates to a wireless television system comprising a transmitting device and a wireless television receiver. The transmitting device receives a television broadcast and transmits the television broadcast by wireless transmission. The wireless television receiver receives the television broadcast transmitted by wireless transmission.

2. Description of the Related Art

A wireless television system is known in which a television broadcast wave received in a room is transmitted to another room for watching. In the system, a transmitting device receives a television broadcast wave using an antenna installed outdoors and transmits the received television broadcast wave by wireless transmission. The receiver of the system receives transmitted television broadcast wave and reproduces video and sound.

FIGS. 29A to 29B and FIGS. 29C to 29E are schematic diagrams of conventional prior art showing system configurations of this type of wireless television system. The systems shown in FIG. 29A and FIG. 29B are conventional prior art compatible with analog broadcasting. On the other hand, the systems shown in FIG. 29C to FIG. 29E are compatible with digital broadcasting.

In the system shown in FIG. 29A, the transmitting device receives a television signal using an antenna installed outdoors and demodulates the television signal. Then, the transmitting device converts the television signal into an MPEG-TS signal. The transmitting device transmits the MPEG-TS signal by wireless transmission, using the 2.4 GHz band (a frequency band used for wireless local area networks [LAN]). After receiving the MPEG-TS signal, the wireless television receiver performs MPEG decoding on the MPEG-TS signal and reconstructs the television signal. Then, the wireless television receiver reproduces video and sound.

In the system shown in FIG. 29B, the transmitting device receives a television broadcast wave. The transmitting device converts the received television broadcast wave to, for example, the 300 MHz band, which is a low-power-unlicensed band. Then, the transmitting device transmits the television broadcast wave converted to the 300 MHz band by performing a frequency conversion. The wireless television receiver receives and demodulates the transmitted television broadcast wave, and reproduces video and sound.

The system shown in FIG. 29C is the system shown in FIG. 29A made compatible with digital terrestrial broadcasting. The transmitting device receives a digital broadcast wave. The transmitting device performs orthogonal frequency-division multiplexing (OFDM) demodulation and MPEG decoding on the digital broadcast wave and obtains a television signal. Then, the transmitting device converts the obtained television signal into an MPEG-TS signal and transmits the MPEG-TS signal by wireless transmission, using the frequency band used for wireless LAN. After receiving the MPEG-TS signal, the wireless television receiver performs MPEG decoding on the MPEG-TS signal and reconstructs the television signal. Then, the wireless television receiver reproduces video and sound.

In the system shown in FIG. 29D, the transmitting device receives a digital broadcast wave. The transmitting device performs OFDM demodulation on the digital broadcast wave and obtains an MPEG-TS signal. Then, the transmitting device transmits the obtained MPEG-TS signal as is by wireless transmission, using the 2.4 GHz band. After receiving the MPEG-TS signal, the wireless television receiver performs MPEG decoding on the MPEG-TS signal and reconstructs the television signal. Then, the wireless television receiver reproduces video and sound.

In the system shown in FIG. 29E, the transmitting device receives a digital television broadcast wave. The transmitting device converts the received digital television broadcast wave to, for example, the 30 MHz band and transmits the converted television broadcast wave by wireless transmission, using the 30 MHz band. The wireless television receiver receives the transmitted television broadcast wave. The wireless television receiver performs OFDM demodulation and MPEG decoding on the television broadcast wave and reproduces video and sound. The wireless television system using the type of system shown in FIG. 29E is disclosed in, for example, Japanese Laid-Open (Kokai) Patent Publication No. 2005-012583.

SUMMARY OF THE INVENTION

An object of the present invention is to provide a wireless television system that is superior to the above-described systems in interference immunity and operability.

In accordance with an aspect of the invention, there is provided a wireless television system including a transmitting device that transmits by wireless transmission a digital broadcast signal obtained by receiving a digital broadcast and a wireless television receiver that receives the digital broadcast signal transmitted by wireless transmission, the wireless television system comprising: a transmission signal generating means, provided in the transmitting device, for generating a transmission signal in which the digital signal obtained by receiving the digital broadcast and control data indicating at least a reception channel of the digital broadcast signal are multiplexed; a wireless transmission means, provided in the transmitting device, for intermittently transmitting by wireless transmission the digital broadcast signal within the transmission signal generated by the transmission signal generating means and transmitting by wireless transmission, between the intermittent wireless transmissions, the control data within the transmission signal generated by the transmission signal generating means; and a receiving means, provided in the wireless television receiver, for receiving the digital broadcast signal intermittently transmitted by wireless transmission and the control data transmitted by wireless transmission, between the intermittent transmissions, from the transmitting device.

In accordance with another aspect of the invention, there is provided a wireless television system, further comprising: a transmitting means, provided in the wireless television receiver, for transmitting by wireless transmission a request signal corresponding to the control data received by the receiving means, between the digital broadcast signal intermittently transmitted by wireless transmission from the transmitting device; and a transmitting control means, provided in the transmitting device, for receiving the request signal transmitted by wireless transmission from the wireless television receiver and controlling a transmitting timing for control data transmitted by wireless transmission from the wireless transmission means.

In accordance with another aspect of the invention, there is provided a wireless television system, wherein the wireless transmission means provided in the transmitting device has a control data transmission and reception period shorter than a predetermined length per each frame of the digital broadcast signal obtained by receiving the digital broadcast, the control data within the transmission signal generated by the transmission signal generating means is transmitted by wireless transmission during the control data transmission and reception period, and the digital broadcast signal within the transmission signal generated by the transmission signal generating means is transmitted by wireless transmission during a time other than the control data transmission and reception period.

In accordance with another aspect of the invention, there is provided a wireless television system, wherein the wireless transmission means provided in the transmitting device has a control data transmission and reception period of a predetermined length at each guard interval provided for a symbol in the digital broadcast signal obtained by receiving the digital broadcast, the control data within the transmission signal generated by the transmission signal generating means is transmitted by wireless transmission during the control data transmission and reception period, and the digital broadcast signal within the transmission signal generated by the transmission signal generating means is transmitted by wireless transmission during a time other than the control data transmission and reception period.

In accordance with another aspect of the invention, there is provided a wireless television system including a transmitting device that transmits by wireless transmission a digital broadcast signal obtained by receiving a digital broadcast and a wireless television receiver that receives the digital broadcast signal transmitted by wireless transmission, the wireless television system comprising: a frame detecting means, provided in the transmitting device, for detecting a frame timing of the digital broadcast signal obtained by receiving the digital broadcast; a transmission signal generating means, provided in the transmitting device, for generating a transmission signal in which the digital signal obtained by receiving the digital broadcast and control data indicating at least a reception channel of the digital broadcast signal are multiplexed; a transmitting means, provided in the transmitting device, for intermittently transmitting by wireless transmission, synchronously with the frame timing detected by the frame detecting means, the digital broadcast signal within the transmission signal generated by the transmission signal generating means; a data transmitting and receiving means, provided in the transmitting device, for transmitting the control data within the transmission signal generated by the transmission signal generating means, between the intermittent wireless transmissions of the digital broadcast signals by the transmitting means, and receiving return data returned from the wireless television receiver in correspondence with the transmitted control data; a receiving means, provided in the wireless television receiver, for receiving the digital broadcast signal intermittently transmitted by wireless transmission and the control data transmitted by wireless transmission between the intermittent transmissions from the transmitting device; and a returning means, provided in the wireless television receiver, for returning return data corresponding to the control data received by the receiving means, between the digital broadcast signals intermittently transmitted by wireless transmission from the transmitting device.

In accordance with another aspect of the invention, there is provided a wireless television system including a transmitting device that transmits by wireless transmission a digital broadcast signal obtained by receiving a digital broadcast and a wireless television receiver that receives the digital broadcast signal transmitted by wireless transmission, the wireless television system comprising: a guard interval detecting means, provided in the transmitting device, for detecting a guard interval timing of the digital broadcast signal obtained by receiving the digital broadcast; a transmission signal generating means, provided in the transmitting device, for generating a transmission signal in which the digital signal obtained by receiving the digital broadcast and control data indicating at least a reception channel of the digital broadcast signal are multiplexed; a transmitting means, provided in the transmitting device, for intermittently transmitting by wireless transmission, synchronously with the guard interval timing detected by the guard interval detecting means, the digital broadcast signal within the transmission signal generated by the transmission signal generating means; a data transmitting and receiving means, provided in the transmitting device, for transmitting the control data within the transmission signal generated by the transmission signal generating means, between the intermittent wireless transmissions of the digital broadcast signals by the transmitting means, and receiving return data returned from the wireless television receiver in correspondence with the transmitted control data; a receiving means, provided in the wireless television receiver, for receiving the digital broadcast signal intermittently transmitted by wireless transmission and the control data transmitted by wireless transmission between the intermittent transmissions from the transmitting device; and a returning means, provided in the wireless television receiver, for returning return data corresponding to the control data received by the receiving means, between the digital broadcast signals intermittently transmitted by wireless transmission from the transmitting device.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWING

FIG. 3 is a diagram for explaining operation modes provided in the wireless television system;

FIG. 22A and FIG. 22B are diagrams for explaining an overview of an intermittent transmission and reception operation based on a frame timing Frame-P or a guard interval timing GI-P according to the fifth embodiment;

FIG. 25A and FIG. 25B are diagrams showing an example of an adjustment of control data transmission and reception timing performed by the transmitting device 100 under an instruction from the wireless television receiver 200;

FIG. 26 is a diagram for explaining an overview of a retransmitting device 300 according to a modified example;

FIG. 29A and FIG. 29B are block diagrams showing configurations examples of conventional prior art used in analog broadcasting; and FIG. 29C to FIG. 29E are block diagrams showing configurations examples of conventional prior art used in digital broadcasting.

DETAILED DESCRIPTION OF THE PREFERRED EMBODIMENTS

The present invention will hereinafter be described in detail with reference to the preferred embodiments shown in the accompanying drawings.

A. First Embodiment

A-1. Overall Configuration

Figure 1:
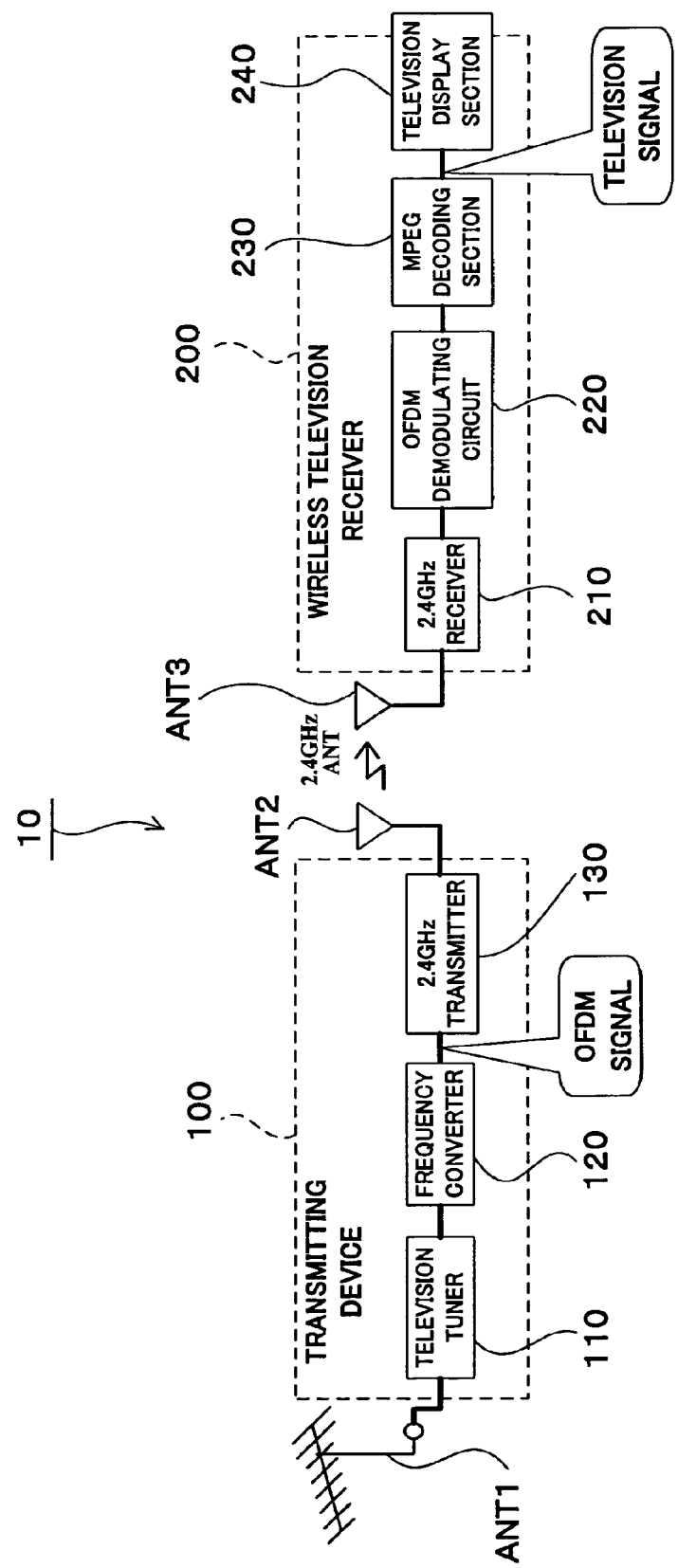
FIG. 1 is a block diagram showing an overall configuration of a wireless television system 10 according to a first embodiment of the present invention.

FIG. 1 is a block diagram showing an overall configuration of a wireless television system 10, according to a first embodiment of the present invention. The wireless television system 10 includes a transmitting device 100 and a wireless television receiver 200. The transmitting device 100 receives a television broadcast wave and transmits the television broadcast wave by wireless transmission. The wireless television receiver 200 receives the television broadcast wave transmitted by wireless transmission from the transmitting device 100 and reproduces video and sound. The transmitting device 100 includes a television tuner 110, a frequency converter 120, and a 2.4 GHz transmitter 130.

The television tuner 110 receives a digital broadcast signal of a reception channel indicated by channel selection. The digital broadcast signal is received via an outdoor antenna. The frequency converter 120 converts the digital broadcast signal (OFDM signal) outputted from the television tuner 110 to the 2.4 GHz band to be used in wireless LAN and outputs the digital broadcast signal. A 2.4 GHz transmitter 130 transmits the digital broadcast signal outputted from the frequency converter 120 by wireless transmission, via a transmission antenna ANT2. The digital broadcast signal is transmitted as a transmission signal of a predetermined channel in the 2.4 GHz band.

The wireless television receiver 200 includes a 2.4 GHz receiver 210, an OFDM demodulating circuit 220, an MPEG decoding section 230, and a television display section 240. The 2.4 GHz receiver 210 receives the digital broadcast signal (OFDM signal) transmitted by wireless transmission from the transmitting device 100, via a reception antenna ANT3. The OFDM demodulating circuit 220 performs OFDM demodulation on the digital broadcast signal (OFDM signal) received by the 2.4 GHz receiver 210 and outputs an MPEG-TS signal (transport stream signal).

The MPEG decoding section 230 separates and extracts a program packet (MPEG data) from the MPEG-TS signal (transport stream signal). In addition, the MPEG decoding section 230 decodes the separated and extracted program packet (MPEG data) into video data and audio data. The MPEG decoding section 230 converts the video data and the audio data into a television signal including video and sound. The MPEG decoding section 230 provides the television signal to the television display section 240. The television display section 240 reproduces video and sound from the provided television signal.

Figure 2:
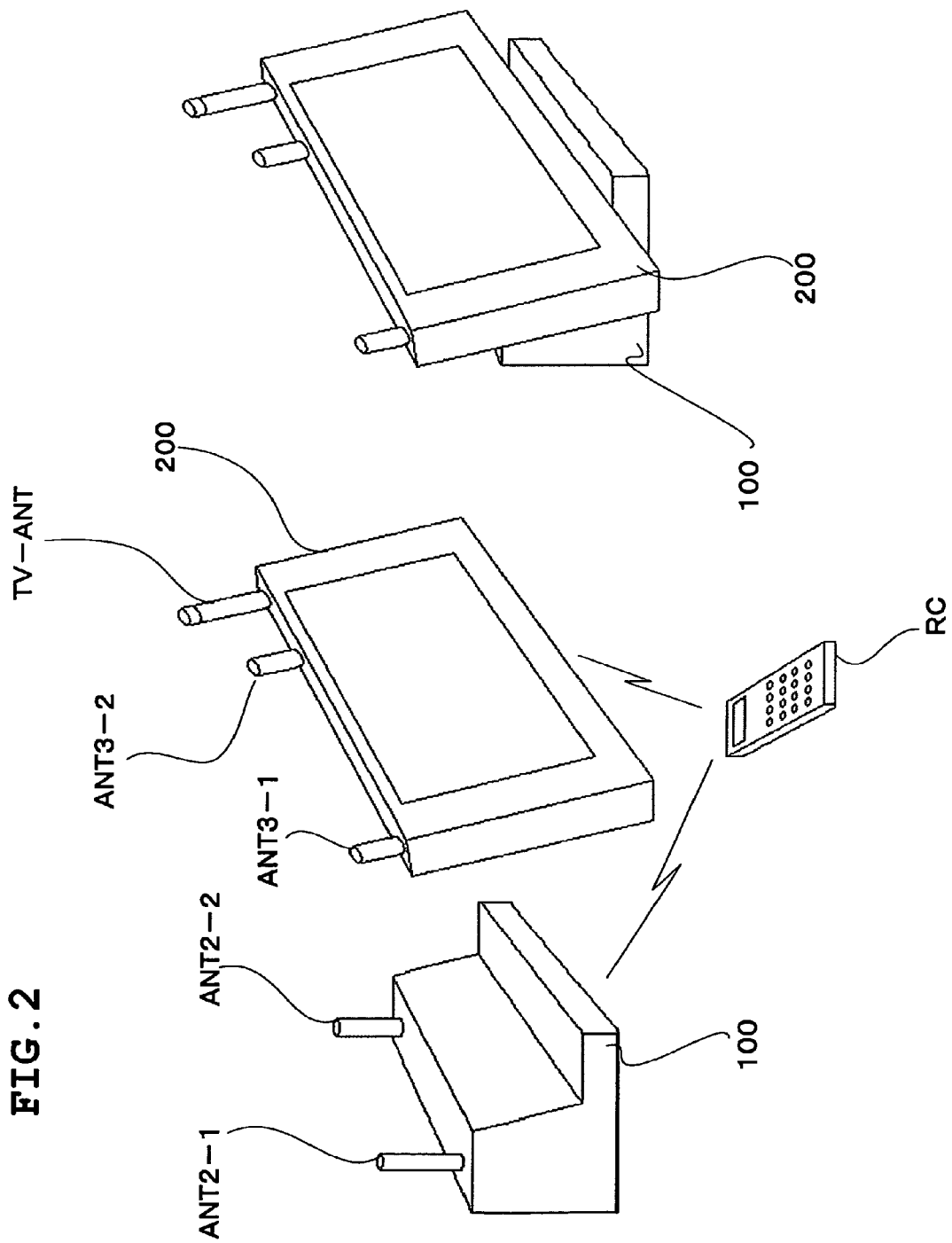
FIG. 2 is an outline view showing an example of the outer appearances of a transmitting device 100 and a wireless television receiver 200 composing the wireless television system 10.

Next, FIG. 2 is an outline view showing an example of the outer appearances of the transmitting device 100 and the wireless television receiver 200 composing the wireless television system 10. In the example of the wireless television system 10 shown in FIG. 2, the transmitting device 100 is compatible with a configuration that can simultaneously retransmit two waves (described hereafter). The transmitting device 100 is installed in a predetermined room on a premise (inside a house or building). The wireless television receiver 200 can be carried and moved within the premise. A reception channel can be respectively set in the transmitting device 100 and the wireless television receiver 200 using an infrared remote controller RC.

The transmitting device 100 is structured so that the wireless television receiver 200 can be removably mounted to the transmitting device 100. When the wireless television receiver 200 is mounted to transmitting device 100, as shown in FIG. 2, the transmitting device 100 functions as a recharging cradle. In addition, the transmitting device 100 and the wireless television receiver 200 function to bi-directionally exchange data, via a contact terminal (not shown).

The wireless television system 10 has operating modes shown in FIG. 3. That is, concerning the side of the transmitting 100, the transmitting device 100 has 2.4 GHz multiple television channel communication mode and 2.4 GHz single television channel communication mode. In 2.4 GHz multiple television channel communication mode, the digital broadcast signals (OFDM signals) of three television channels are simultaneously sent using three channels of the 2.4 GHz band. In 2.4 GHz single television channel communication mode, the digital broadcast signals (OFDM signals) of one television channel are sent simultaneously using three channels of the 2.4 GHz band.

On the other hand, concerning the side of the wireless television receiver 200, the wireless television receiver 200 has 2.4 GHz multiple television channel communication mode and 2.4 GHz single television channel communication mode for indoor use. In addition, the wireless television receiver 200 has UHF receive only mode for outdoor use. 2.4 GHz multiple television channel communication mode corresponds to 2.4 GHz multiple television channel communication mode provided in the transmitter device 100. In 2.4 GHz multiple television channel communication mode, the wireless television receiver 200 compares the received level of the television wave of the channel converted to 2.4 GHz band and the received level of a directly received television wave. The wireless television receiver 200 automatically selects the channel with the higher received level.

2.4 GHz single television channel communication mode corresponds to 2.4 GHz single television channel communication mode provided in the transmitting device 100, and 2.4 GHz single television channel communication mode relates to one limited television channel. In the 2.4 GHz single television channel communication mode, the wireless television receiver 200 compares the reception sensitivities of a plurality of 2.4 GHz band channels and the received level of a directly received television channel. The wireless television receiver 200 automatically selects the channel with the higher received level. In the UHF receive only mode, only the television channel of the UHF band is received. In this case, reception using the 2.4 GHz band is turned off.

A-2. Configuration and Operations of Transmitting Device 100

Figure 4:
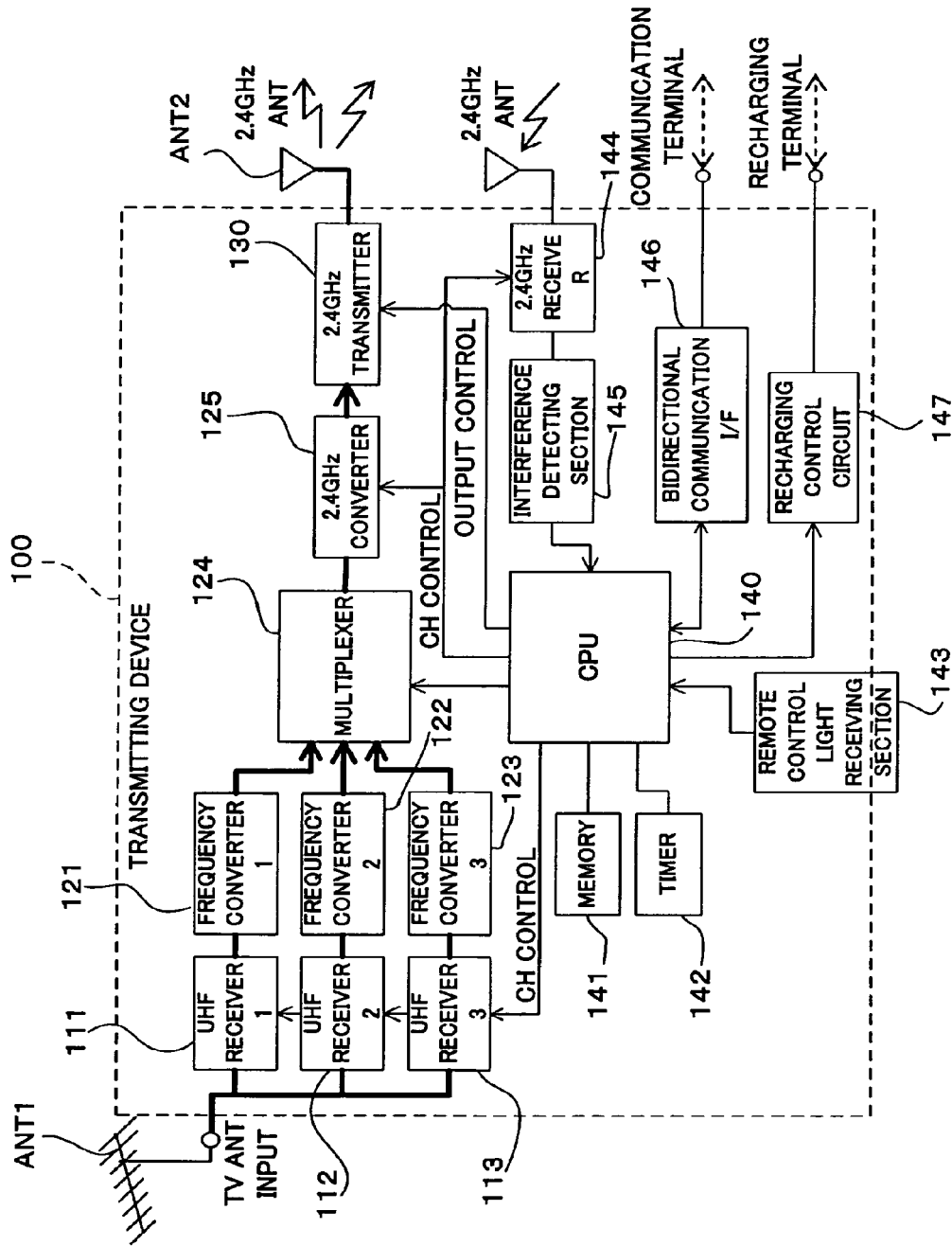
FIG. 4 is a block diagram showing a configuration of the transmitting device 100 according to the first embodiment.

Next, a configuration and operations of the transmitting device 100 will be explained with reference to FIG. 4 to FIG. 8. FIG. 4 is a block diagram showing the configuration of the transmitting device 100. In FIG. 4, reference numbers 111 to 113 represent UHF receivers composing the above-described television tuner 110. The UHF receivers 111 to 113 receive digital broadcast signals of a reception channel according to a channel control signal provided by a central processing unit (CPU) 140. In this case, the UHF receiving sections 111 to 113 receive the digital broadcast signals via an outdoor antenna ANT1. Reference numbers 121 to 125 represent the sections which compose the above-described frequency converter 120. Intermediate frequency converters 121 to 123 convert the digital broadcast signals outputted from the UHF receivers 111 to 113 respectively to a predetermined intermediate frequency.

A multiplexer 124 performs frequency division multiplexing on respective digital broadcast signals outputted from the intermediate frequency converters 121 to 123 and outputs the multiplexed digital broadcast signal. A 2.4 GHz converter 125 converts the digital broadcast signal outputted from the multiplexer 124 to a frequency of a predetermined channel of the 2.4 band specified by the CPU 140. Then, the 2.4 GHz converter 125 outputs the converted digital broadcast signal. The 2.4 GHz transmitter 130 in a following stage performs radio frequency amplification on the digital broadcast signal outputted from the 2.4 GHz converter 125, under the control of the CPU 140. The 2.4 GHz transmitter 130 transmits the digital broadcast signals by wireless transmission, via the transmission ANT2. In this case, the digital broadcast signal is transmitted as a transmission signal of a predetermined channel of the 2.4 GHz band. The CPU 140 controls each section of the device according to various control programs stored in a memory 141.

A timer 142 generates a timer clock required for the processes performed by the CPU 140. A remote control light receiving section 143 receives infrared communication data from the infrared remote control (not shown) and provides the CPU 140 with the infrared communication data. A 2.4 GHz receiver 144 and an interference detecting section 145 perform a channel scan on the 2.4 GHz band and checks for interference, under the control of the CPU 140. Details of such interference detections will be explained hereafter.

When the wireless television receiver 200 is mounted to the transmitting device 100, as shown in FIG. 2A, a bidirectional communication interface 146 exchanges data with the wireless television receiver 200, via the communication terminal. When the wireless television receiver 200 is mounted to the transmitting device 100, a recharging control circuit 147 recharges a battery in the wireless television receiver 200, via a recharging terminal.

Figure 5:
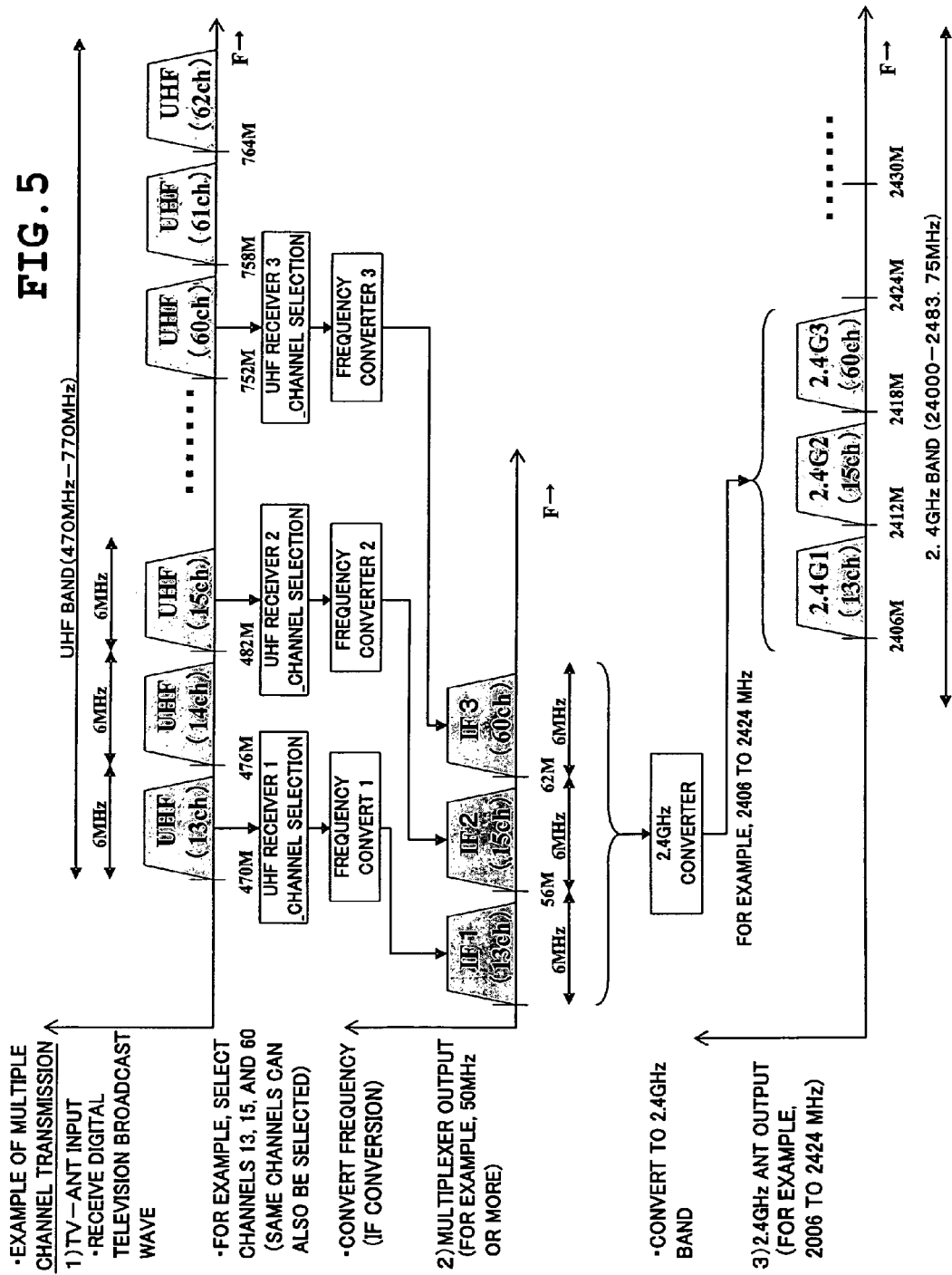
FIG. 5 is a diagram for explaining an overview of an operation performed by the transmitting device 100 according to the first embodiment.
Figure 6:
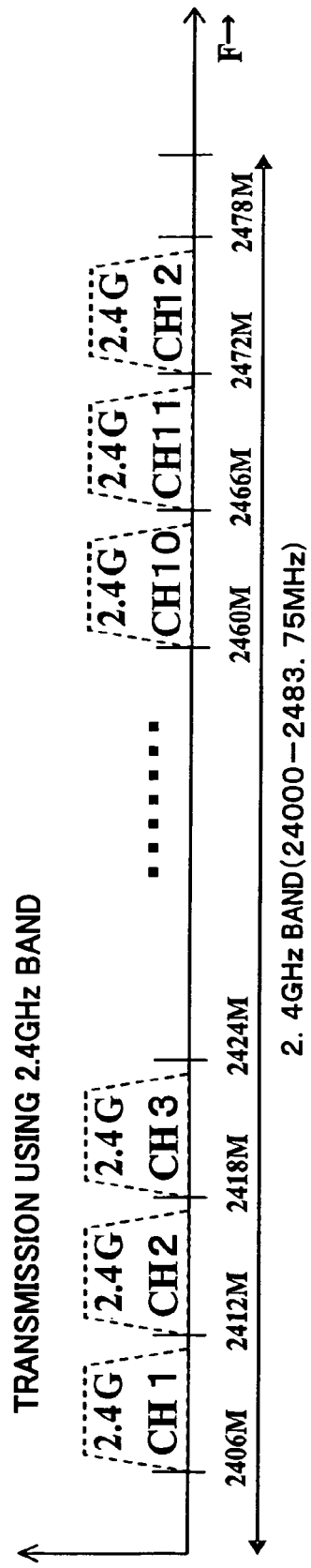
FIG. 6 is a diagram showing an example of channel assignment for transmitting images using the 2.4 GHz band.

In such a configuration, for example, as shown in FIG. 5, the UHF receivers 111 to 113 composing the television tuner 110 receive the digital broadcast signals of channel 13, channel 14, and channel 60 in the UHF band. Then, the intermediate frequency converters 121 to 123 convert the digital broadcast signal of each channel to intermediate frequencies IF1 to IF 3 respectively. Subsequently, the multiplexer 124 performs frequency division multiplexing on the digital broadcast signals of the intermediate frequencies IF1 to IF3 and outputs the digital broadcast signals. After that, the 2.4 GHz converter 125 converts the intermediate frequencies IF1 to IF3 of the frequency-division-multiplexed digital broadcast signals to the frequency of the predetermined channels in the 2.4 GHz band. As shown in FIG. 6, channels having a 6 MHz bandwidth can be assigned within 2400 MHz to 2483.75 MHz in the 2.4 GHz band.

As explained hereafter, the CPU 140 scans all channels in the 2.4 GHz band, using the 2.4 GHz receiver 114 and the interference detecting section 145. The CPU 140 selects three consecutive channels having the lowest interference levels among the scanned channels. Then, the CPU 140 instructs the 2.4 GHz converter 125 to perform conversions corresponding to the frequencies of the three selected channels. For example, in the example shown in FIG. 5, the intermediate frequencies IF1 to IF3 of the frequency-division-multiplexed digital broadcast signals are assigned to a first channel, a second channel, and a third channel. The first channel is assigned to 2406 MHz to 2412 MHz. The second channel is assigned to 2412 MHz to 2418 MHz. The third channel is assigned to 2418 MHz to 2424 MHz.

Figure 7:
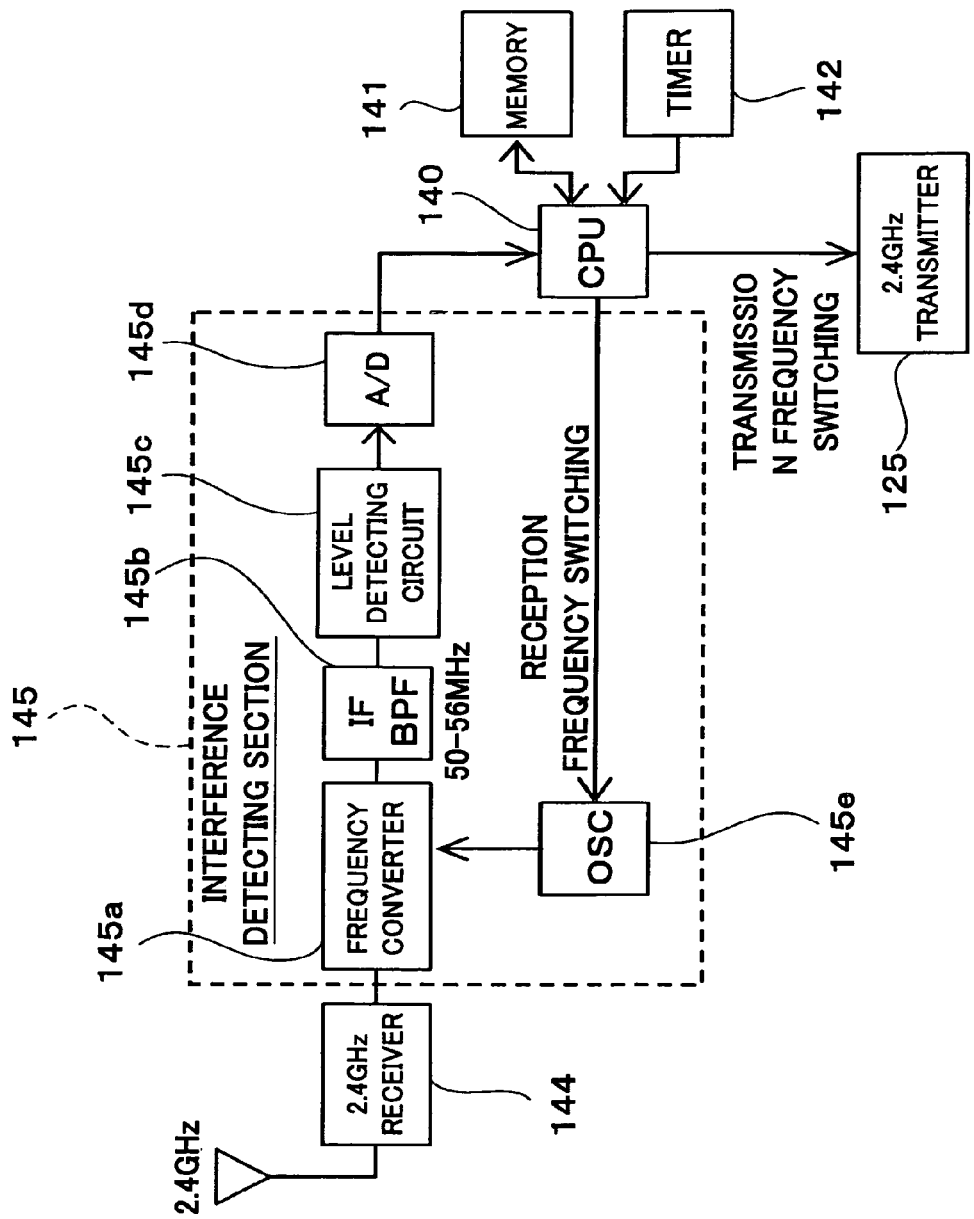
FIG. 7 is a block diagram showing a configuration of an interference detecting section 145 according to the first embodiment.

Next, a configuration of the interference detecting section 145 will be explained with reference to FIG. 7. Elements within FIG. 7 that are the same as that in the configuration shown in FIG. 4 are given the same reference numbers. Explanations thereof are omitted. The interference detecting section 145 includes a frequency converter 145a, a band pass filter (BPF) 145b, a level detecting circuit 145c, an analog-to-digital (A/D) converter 145d, and a variable oscillator 145e. The CPU 140 accumulates (namely, consecutively adds) the clock count of the timer clock outputted from the timer 142. The CPU 140 generates a reception frequency switching instruction (scan instruction) at every certain amount of time and provides the variable oscillator 145e with the instruction.

The variable oscillator 145e generates an oscillation signal based on the reception frequency switching instruction (scan instruction) from the CPU 140. The frequency converter 145a converts a reception output of the reception frequency based on the oscillation signal provided by the variable oscillator 145e, among the reception output from the 2.4 GHz receiver 144, to an intermediate frequency IF. The level detecting circuit 145c detects the amplitude level of the component filtered by the BPF 145b. The A/D converter 145d performs an A/D conversion on the detected amplitude level and provides the CPU 140 with the amplitude level.

The CPU 140 stores the amplitude level of each reception channel provided by the A/D converter 145c in the memory 141. When the amplitude levels of all reception channels are stored in the memory 141, the CPU 140 selects three consecutive channels with the lowest amplitude levels, among the stored amplitude levels. The CPU 140 notifies the 2.4 GHz converter 125 of the three selected channels.

Figure 8:
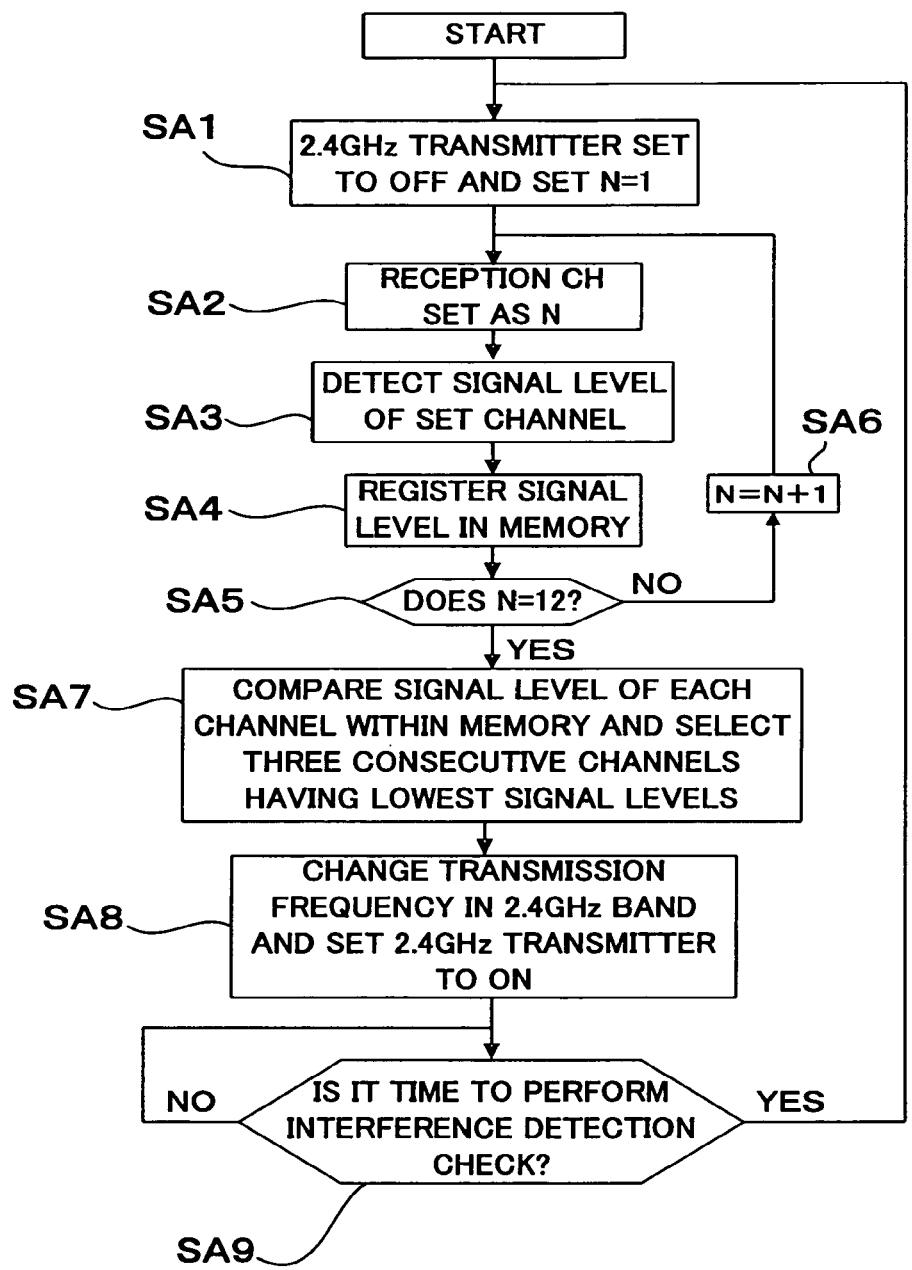
FIG. 8 is a flowchart showing an operation performed by the interference detecting section 145 according to the first embodiment.

Next, the operations of the CPU 140 will be explained with reference to FIG. 8. When it is time for an interference detection check, the CPU 140 proceeds to Step SA1, shown in FIG. 8. At Step SA1, the CPU 140 sets the 2.4 GHz transmitter 130 to an OFF-state and sets channel number N to an initial value "1". Next, at Step SA2, the CPU 140 sets the reception channel CH as the channel number N. The channel number N corresponds to one channel among all reception channels (12 channels). The reception channel CH changes between 1 to 12, so that all reception channels can be sequentially scanned. At Step SA3, the CPU 140 obtains the signal level (amplitude level) of the reception channel CH of the channel number N from the A/D converter 145d. At Step SA4, the CPU 140 registers the obtained signal level in the memory 141.

Next, at Step SA5, the CPU 140 judges whether the channel number N has reached "12". In other words, the CPU 140 judges whether the scanning of all reception channels is completed. When the scanning of all reception channels is not completed, the judgment result is "NO". The CPU 140 proceeds to Step SA6. The CPU 140 increments the channel number N in steps and returns to the process at Step SA2. Subsequently, the CPU 140 repeats Steps SA2 to SA5 until the scanning of all reception channels is completed. When the scanning of all reception channels is completed, the judgment result at Step SA5 is "YES". The CPU 140 proceeds to Step SA7.

At Step SA7, the CPU 140 compares the signal level of each reception channel registered in the memory 141 with each other. The CPU 140 selects three consecutive channels with the lowest signal levels. In this embodiment, the three consecutive channels with the lowest signal levels are selected. However, this is not limited thereto, and three channels having the lowest signal levels can be selected sequentially. In other words, unused channels having no interference or crosstalk are found for selecting.

When the three consecutive channels having the lowest signal levels are selected in this way, the CPU 140 proceeds to Step SA8. The CPU 140 changes the transmission frequency in the 2.4 GHz band and sets the 2.4 GHz transmitter to an ON-state. Then, the CPU 140 proceeds to Step SA9 and judges whether it is time to perform the interference detection check. When it is time for the check, the judgment result is "YES". The CPU 140 returns to the process at Step SA1.

A-3. Configuration and Operations of Wireless Television Receiver 200

Figure 9:
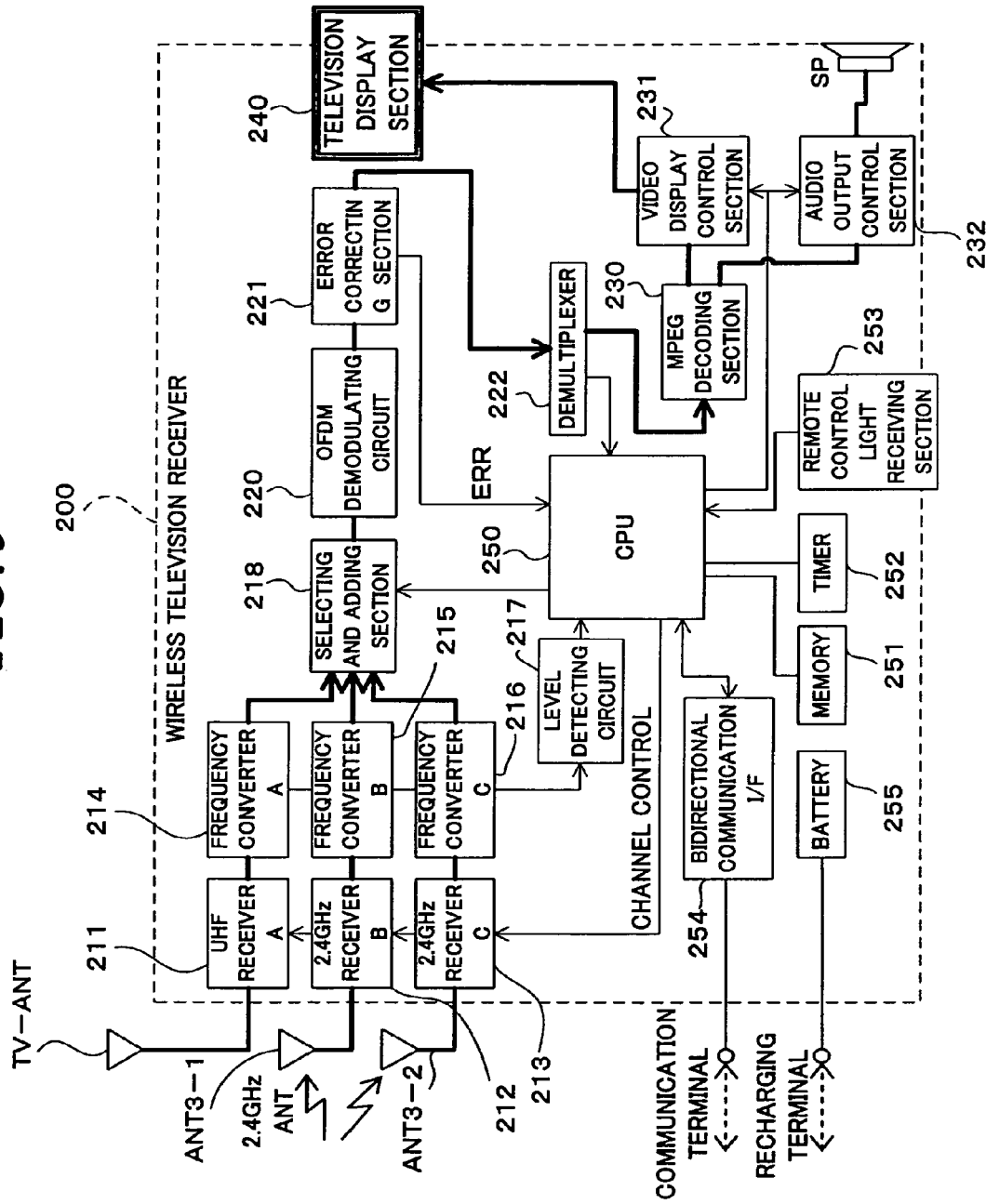
FIG. 9 is a block diagram showing a configuration of the wireless television receiver 200 according to the first embodiment.

Next, a configuration and operations of the wireless television receiver 200 will be explained, with reference to FIG. 9 to FIG. 12. FIG. 9 is a block diagram showing the configuration of the wireless television receiver 200. In FIG. 9, a UHF receiver 211 directly receives digital terrestrial broadcast using an antenna TV-ANT. 2.4 GHz receivers 212 to 213 receive digital broadcast signals transmitted by wireless transmission from the transmitting device 100, using antennas ANT3-1 to ANT3-2 respectively. The UHF receiver 211 and the 2.4 GHz receivers 212 to 213 respectively receive the digital broadcast signals of channels based on a channel control signal provided by a CPU 250.

Intermediate frequency converters 214 to 216 convert the digital broadcast signals respectively received by and outputted from the UHF receiver 211 and the 2.4 GHz receivers 212 to 213 to an intermediate frequency (for example, 50 MHz to 56 MHz). Then, the intermediate frequency converters 214 to 216 output the converted digital broadcast signals. Each digital broadcast signal outputted from the IF converters 214 to 216 is provided to a selecting and adding section 218 in the next stage. At the same time, each digital broadcast signal is provided to a level detecting circuit 217. The level detecting circuit 217 detects the respective output levels of the intermediate frequency converters 214 to 216, performs A/D conversion on the output levels, and provides the CPU 250 with the output levels.

The CPU 250 stores each output level of the intermediate frequency converters 214 to 216, outputted from the level detecting circuit 217, in a memory 251. The CPU 250 compares each of the stored output levels and provides the comparison result to the selecting and adding section 218. The selecting and adding section 218 may select one wave from any one of the intermediate frequency converters 214 to 216, taking into consideration the level comparison results from the CPU 250 and error rate values from an error correcting section 221, described hereafter, and output the selected wave. Alternatively, the selecting and adding section 218 may add any two waves or three waves and output the added waves.

An OFDM demodulating circuit 220 performs an OFDM demodulation on the digital broadcast signal outputted from the selecting and adding section 218 and converted to an intermediate frequency. The error correction section 221 performs a Reed-Solomon error correction on the OFDM demodulation signal outputted from the OFDM demodulating circuit 220 and generates an MPEG-TS signal (transport stream signal). In addition, the error correction section 221 sends an error rate ERR at the time of error correction to the CPU 250. A demultiplexer 222 separates and extracts a program packet (MPEG data) from the MPEG-TS signal (transport stream signal). The demultiplexer 222 respectively provides an MPEG decoding section 230 with the separated and extracted program packet (MPEG data) and the CPU 250 with the data broadcast signals, such as text broadcasting.

The MPEG decoding section 230 decodes the program packet (MPEG data) provided from the demultiplexer 222 to image data and audio data. Reference number 231 represents a video display control section. The video display control section 231 converts the image data decoded by the MPEG decoding section 230 to video signals. In addition, the video display control section 231 controls the display section 240 to reproduce images. Reference number 232 represents an audio output control section. The audio output control section 232 converts the audio data decoded by the MPEG decoding section 230 to audio signals and controls a speaker SP to reproduce sound based on audio signals.

The CPU 250 controls each section within the receiver according to various control programs stored in a memory 251. A timer 252 generates a timer clock required for the CPU 250 to perform processes. A remote control light receiving section 253 receives infrared communication data from the infrared remote control (not shown) and provides the CPU 250 with the infrared communication data. When the wireless television receiver 200 is mounted to the transmitting device 100, as shown in FIG. 2A, a bidirectional communication interface 254 exchanges data with the transmitting device 100, via the communication terminal. When the wireless television receiver 200 is mounted to the transmitting device 100, a battery 255 is charged via a recharging terminal.

A-4. Operations

Figure 10:
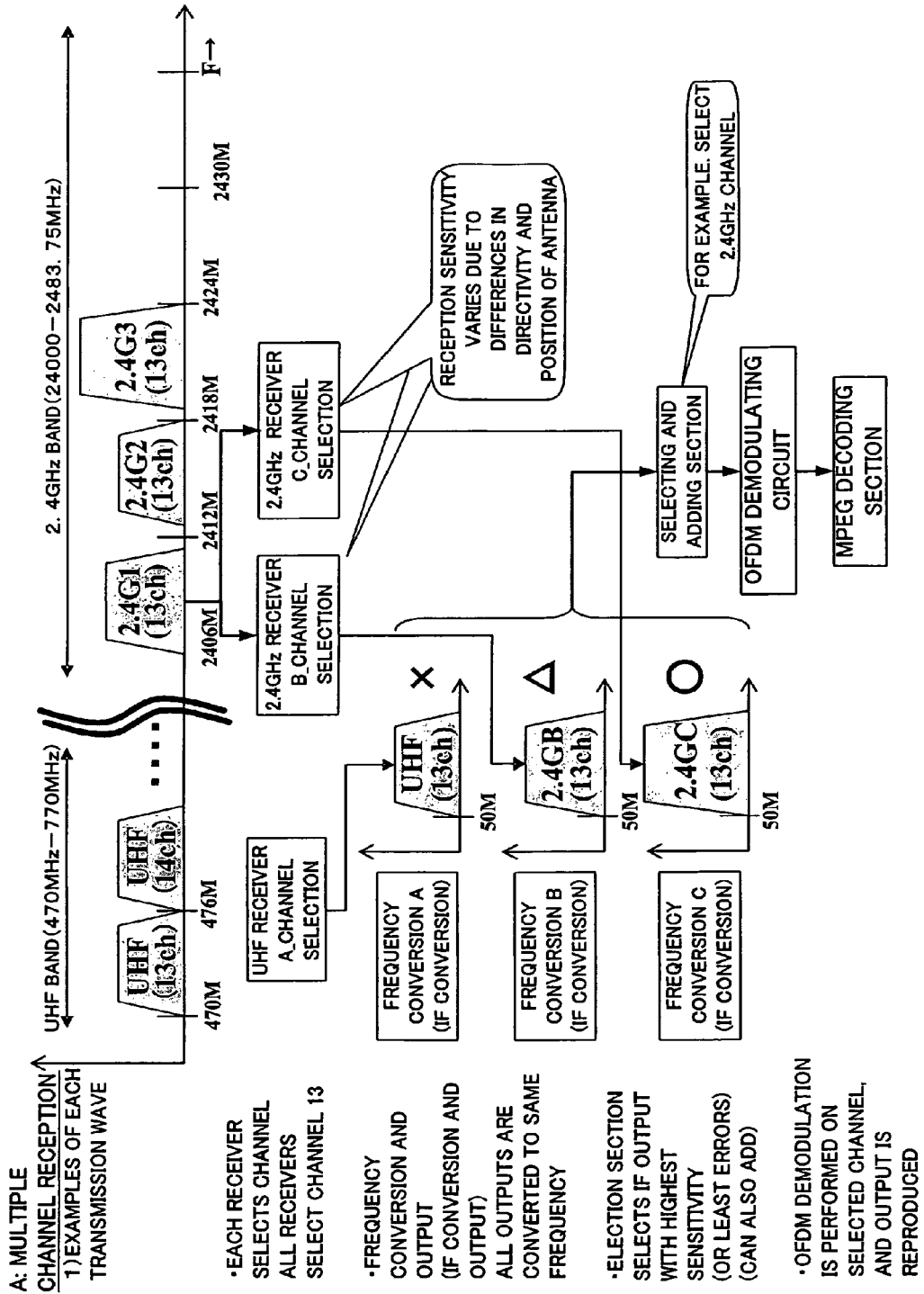
FIG. 10 is a diagram for explaining an overview of a multiple channel reception operation performed by the wireless television receiver 200 according to the first embodiment.
Figure 11:
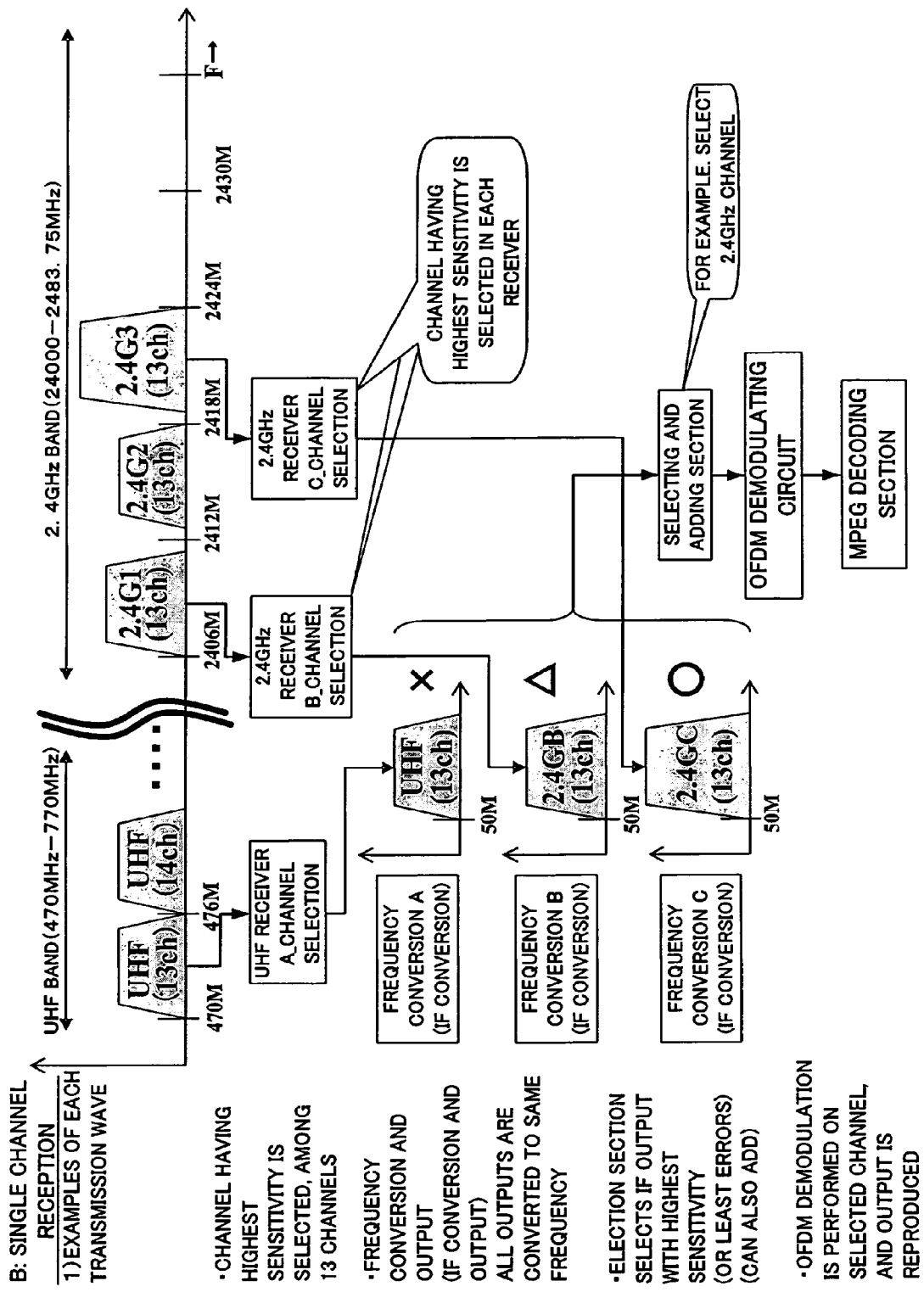
FIG. 11 is a diagram for explaining an overview of a single channel reception operation performed by the wireless television receiver 200 according to the first embodiment.

Next, a multiple channel reception operation and a single channel reception operation performed by the wireless television receiver 200 will be explained, with reference to FIG. 10 to FIG. 12.

<Multiple Channel Reception Operation>

In the wireless television receiver 200 configured as described above, for example, a user sets the reception channel to view channel 13 of the UHF band. Then, the wireless television receiver 200 performs a multiple channel reception, as shown in FIG. 10. Among a first channel (UHF channel 13), a second channel (UHF channel 15), and a third channel (UHF channel 60) transmitted from the transmitting device 100 using the 2.4 GHz band, the 2.4 GHz receivers 212 and 213 both receive the first channel (UHF channel 13) of the 2.4 GHz band. The UHF receiver 211 receives the channel 13 of the UHF band, via the antenna TV-ANT.

The intermediate frequency converters 214 to 216 respectively convert the digital broadcast signals outputted from the UHF receiver 211 and the 2.4 GHz receivers 212 to 213 to an intermediate frequency. Then, the intermediate frequency converters 214 to 216 provide the selecting and adding section 218 with the digital broadcast signals. At the same time, the intermediate frequency converters 214 to 216 provide the level detecting circuit 217 with the digital broadcast signals. Subsequently, the level detecting circuit 217 detects the respective output levels of the intermediate frequency converters 214 to 216. Furthermore, the level detecting circuit 217 performs A/D conversion on the output levels and provides the CPU 250 with the output levels. The CPU 250 stores each output level in the memory 251, compares each output level stored in the memory 251 and provides the results of the comparison performed on each output level to the selecting and adding section 218.

The selecting and adding section 218 selects one wave from any one of the respective outputs from the intermediate frequency converters 214 to 216, taking into consideration the level comparison results from the CPU 250 and the error rate values from the error correcting section 221, described hereafter, and output the selected wave to the next stage. Alternatively, the selecting and adding section 218 adds any two waves or three waves and outputs the added waves. For example, as shown in FIG. 10, if the output level of the intermediate frequency converter 216 (the digital broadcast signal received by the 2.4 GHz receiver 213) has the highest sensitivity (or least amount of reception errors), the selecting and adding section 218 selects this output level and outputs the selected output level to the OFDM demodulating circuit 220 in the next stage.

Subsequently, the OFDM demodulating circuit 220 performs OFDM demodulation on the digital broadcast signal which has been converted to an intermediate frequency provided by the selecting and adding section 218. The error correction section 221 performs the Reed-Solomon error correction on the OFDM demodulated signal and generates an MPEG-TS signal (transport stream signal). The demultiplexer 222 separates and extracts the program packet (MPEG data) from the MPEG-TS signal (transport stream signal). The MPEG decoding section 230 decodes the program packet (MPEG data) into image data and audio data. The video display control section 231 and the audio output control section 232 reproduces respectively images and sounds from the decoded image data and audio data.

<Single Channel Reception Operation>

In the wireless television receiver 200 configured as described above, for example, the user sets the reception channel to view channel 13 on the UHF band. Then, the wireless television receiver 200 performs a single channel reception, as shown in FIG. 11. Among a first channel (UHF channel 13), a second channel (UHF channel 13), and a third channel (UHF channel 13) transmitted from the transmitting device 100 using the 2.4 GHz band, the 2.4 GHz receivers 212 and 213 receive the first channel and the third channel (UHF channel 13) of the 2.4 GHz band that have high sensitivity. The UHF receiver 211 receives channel 13 of the UHF band, via the antenna TV-ANT.

The intermediate frequency converters 214 to 216 respectively convert the digital broadcast signals outputted from the UHF receiver 211 and the 2.4 GHz receivers 212 to 213 to an intermediate frequency. Then, the intermediate frequency converters 214 to 216 provide the selecting and adding section 218 with the digital broadcast signals. At the same time, the IF converters 214 to 216 provide the level detecting circuit 217 with the digital broadcast signals. Then, the level detecting circuit 217 detects the respective output levels of the IF converters 214 to 216. The level detection circuit 217 performs A/D conversion on the output levels and provides the CPU 250 with the output levels. The CPU 250 stores each output level in the memory 251, compares each output level stored in the memory 251 and provides the results of the comparison performed on each output level to the selecting and adding section 218.

The selecting and adding section 218 selects one wave from any one of the outputs from the intermediate frequency converters 214 to 216, taking into consideration the level comparison results from the CPU 250 and the error rate values from the error correcting section 221, described hereafter, and output the selected wave. For example, as shown in FIG. 11, if the output level of the intermediate frequency converter 216 (the digital broadcast signal received from the 2.4 GHz receiver 213) has the highest sensitivity (or the least amount of reception errors), the selecting and adding section 218 selects this output level and outputs the selected output level to the OFDM demodulating circuit 220 in the next stage.

Subsequently, the OFDM demodulating circuit 220 performs OFDM demodulation on the digital broadcast signal which has been converted to an intermediate frequency provided by the selecting and adding section 218. The error correction section 221 performs the Reed-Solomon error correction on the OFDM demodulated signal and generates an MPEG-TS signal (transport stream signal). The demultiplexer 222 separates and extracts the program packet (MPEG data) from the MPEG-TS signal (transport stream signal). The MPEG decoding section 230 decodes the program packet (MPEG data) into image data and audio data. The video display control section 231 and the audio output control section 232 reproduce images and sounds from the decoded image data and audio data.

Next, an example of a selection operation performed by the selecting and adding section 218 will be explained, with reference to FIG. 12. For example, when the wireless television receiver 200 is set outdoors (period when t<T1), the signal level of a frequency conversion A (output [IF-A] from the intermediate frequency converter 214) is large. Where, [t] is the symbol for present time and corresponds to the position of the wireless television receiver 200.

The frequency conversion A is acquired by the UHF receiver 211 directly receiving the UHF band, via the antenna TV-ANT. Therefore, the selecting and adding section 218 selects the frequency conversion A. As the wireless television receiver 200 moves from outdoors to indoors, the signal level of the frequency conversion A (output IF-A from the intermediate frequency converter 214) decreases. On the other hand, the signal level of a frequency conversion B (output [IF-B] from the IF converter 215) corresponding to the output from the 2.4 GHz receiver 212 receiving the transmission wave from the transmitting device 100 or a frequency conversion C (output [IF-C] from the IF converter 216) corresponding to the output from the 2.4 GHz receiver 213 increases.

Figure 12:
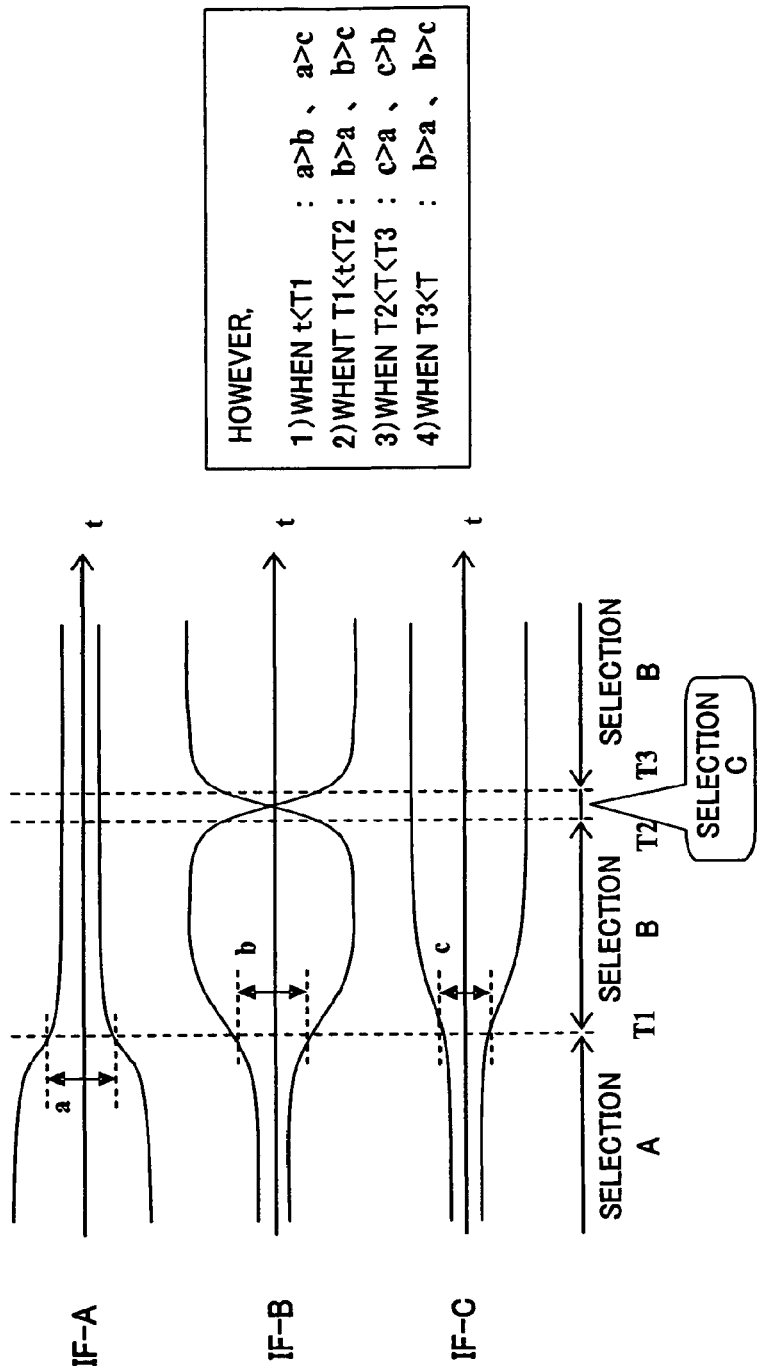
FIG. 12 is a diagram for explaining an example of a selection operation performed by a selecting and adding section 218.

In the example shown in FIG. 12, the signal level of the IF-frequency conversion B is higher than the signal level IF-frequency conversion C because of differences in antenna directionality. Therefore, the selecting and adding section 218 selects the IF-frequency conversion B after T1. Subsequently, at T2<t<T3, a multi-pass is generated when the user carries and moves the wireless television receiver 200 within the room. In the response to above-mentioned multi-pass, when the signal level of the IF-frequency conversion B suddenly decreases as a result, the IF-frequency conversion C is selected during this period (T2<t<T3). After T3, when the multi-pass is released, the signal level of the IF-frequency conversion B exceeds the signal level of the IF-frequency conversion C again. Therefore, the selecting and adding section 218 selects the IF-frequency conversion B.

In FIG. 12, an example in which the selecting and adding section 218 selects any one of three waves is given. However, when each signal level sum is monitored by the level detecting circuit 217, the most suitable among the combinations may be selected. Where, the signal level sums are IF-A+IF-B, IF-B+IF-C, IF-C+IF-A, and IF-A+IF-B+IF-C. In addition, when the error rate value of the error correction section 221 is considered, the most suitable IF-frequency conversion having a signal level that is relatively small and a low error rate may be selected, among the IF-frequency conversions A to C.

B. Second Embodiment

B-1. Configuration of Transmitting Device 100

Figure 13:
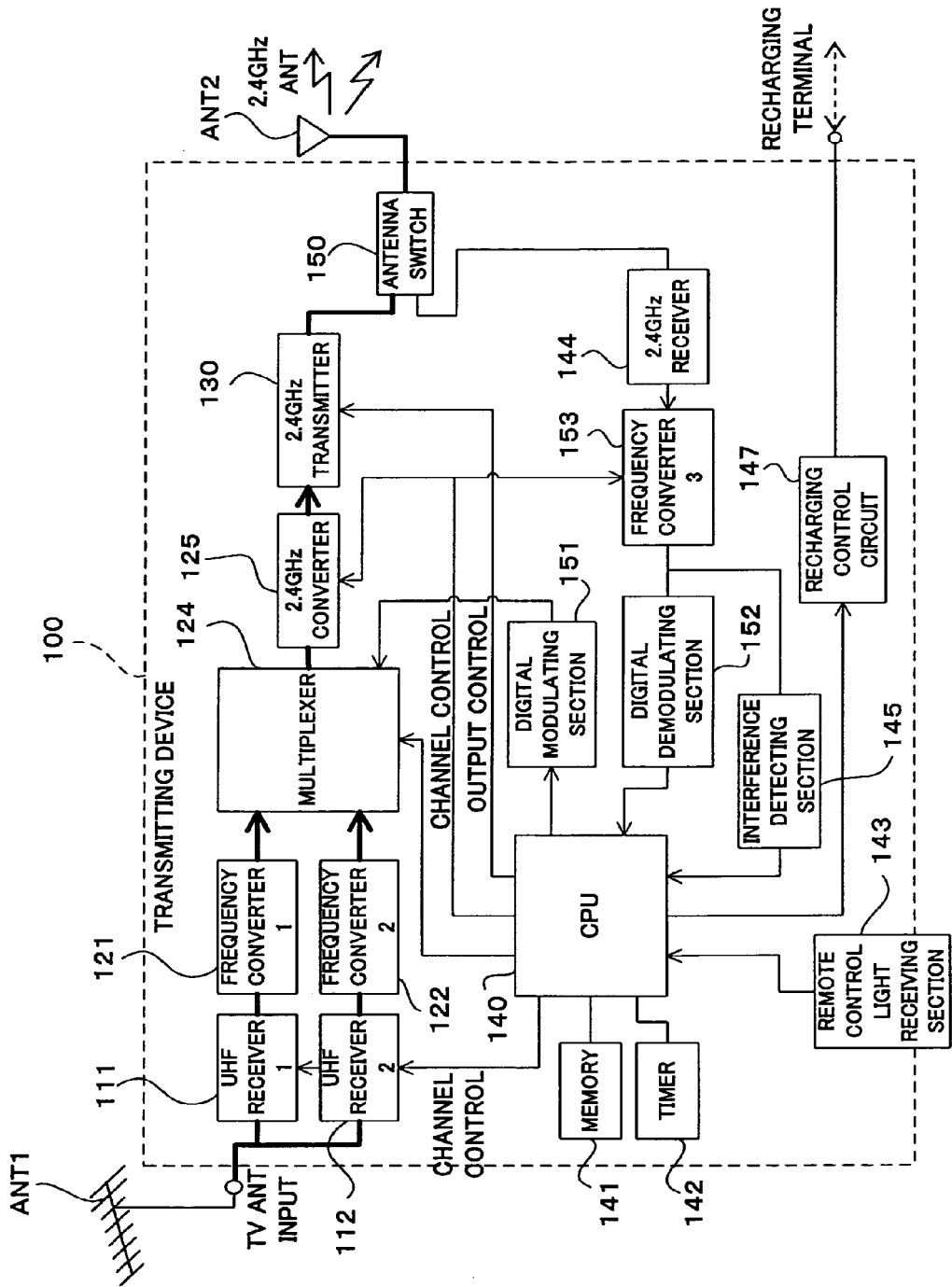
FIG. 13 is a block diagram showing a configuration of the transmitting device 100 according to a second embodiment.

Next, the transmitting device 100 according to a second embodiment will be explained, with reference to FIG. 13 to FIG. 14. FIG. 13 is a block diagram showing a configuration of the transmitting device 100 according to the second embodiment. In FIG. 13, the UHF receivers 111 to 112 receive the digital broadcast signals of a reception channel based on a channel control signal provided by the CPU 140 via an outdoor antenna ANT1. The intermediate frequency converters 121 to 122 convert the digital broadcast signals respectively outputted from the UHF receivers 111 to 112 to a predetermined intermediate frequency and output the converted digital broadcast signals.

The multiplexer 124 multiplexes each digital signal outputted from the intermediate frequency converters 121 to 122 and modulation signals (control data) generated by a digital modulating section 151, described hereafter. The control data refers to data including an identification code for communication, broadcast station selection information, 2.4 GHz channel information, received level information, interference wave information, and the like. The 2.4 GHz converter 125 converts the signal outputted from the multiplexer 124 to the frequency of a predetermined channel of the 2.4 GHz band, specified by the CPU 140. The 2.4 GHz transmitter 130 in the following stage performs radio frequency amplification on the signal outputted from the 2.4 converter 125, under the control of the CPU 140. The 2.4 GHz transmitter 130 transmits the signal by wireless transmission as the transmission signal of the predetermined channel of the 2.4 GHz band, via the transmission antenna ANT2. The CPU 140 controls each section within the device according to various programs stored in the memory 141.

The timer 142 generates the timer clock required for the processes performed by the CPU 140. The remote control light receiving section 143 receives infrared communication data from the infrared remote control (not shown) and provides the CPU 140 with the infrared communication data. When the wireless television receiver 200 is mounted to the transmitting device 100, the recharging control circuit 147 recharges the battery in the wireless television receiver 200, via the recharging terminal. An antenna switch 150 switches between the transmission path and the reception path, under the control of the CPU 140. In other words, the antenna switch 150 connects the output path from the 2.4 GHz transmitter 130 to the antenna ANT2 during transmission. The antenna switch 150 connects the antenna ANT2 to the 2.4 GHz receiver 144 during reception. The 2.4 GHz receiver 144 receives the control data transmitted by the wireless television receiver 200, described hereafter, using the predetermined channel of the 2.4 GHz band.

An intermediate frequency converter 153 converts the reception signal (control data) received by the 2.4 GHz receiver 144 to an intermediate frequency corresponding to a channel specified by the CPU 140. Then, the intermediate frequency converter 153 provides a digital demodulating section 152 and the interference detecting section 145 in the next stage with the reception signal. The digital demodulating section 152 demodulates the intermediate frequency output from the intermediate frequency converter 153 and provides the CPU 140 with the extracted control data. The interference detecting section 145 detects the interference wave level based on the intermediate frequency output from the intermediate frequency converter 153. The digital modulating section 151 performs digital modulation on the control data generated by the CPU 140. The digital modulating section 151 provides the multiplexer 124 with the obtained modulated signal.

In this way, in the transmitting device 100 according to the second embodiment, the control data is exchanged with the wireless television receiver 200 by wireless transmission, in place of the bidirectional interface 146 (see FIG. 4) provided in the first embodiment. Therefore, the transmitting device 100 according to the second embodiment includes the antenna switch 150, the 2.4 GHz receiver 144, the intermediate frequency converter 153, the digital demodulating section 152, and the digital modulating section 151.

Figure 14:
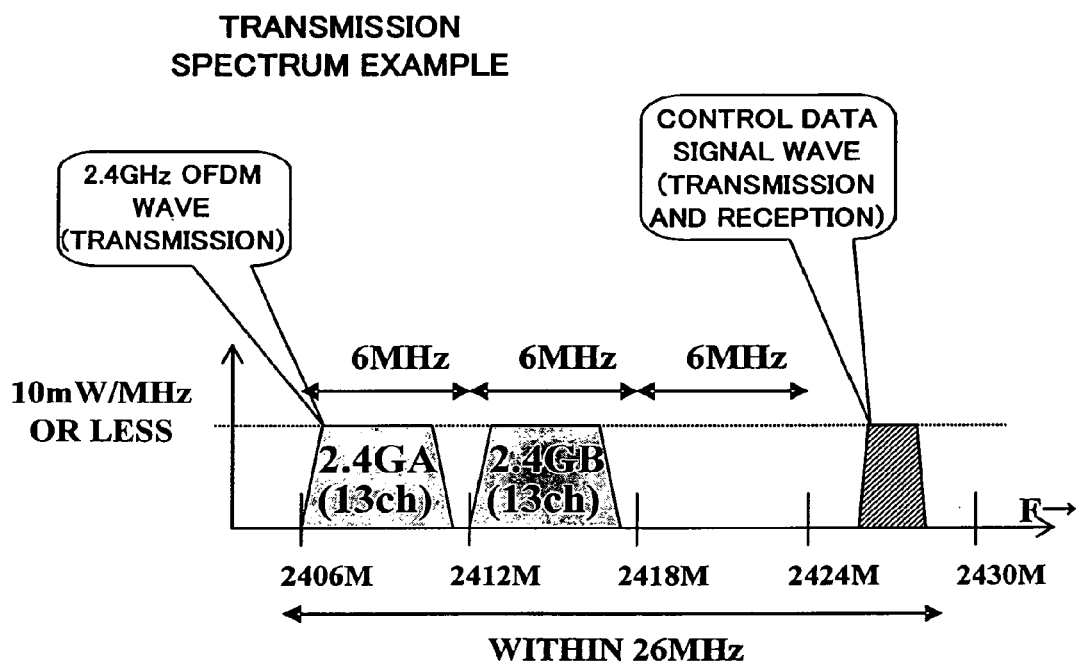
FIG. 14 is a diagram showing an example of a transmission spectrum of the transmitting device 100 according to the second embodiment.

According to such a configuration, as is clear from the transmission spectrum example shown in FIG. 14, the digital broadcast signal (OFDM signal) is transmitted from the transmitting device 100 to the wireless television receiver 200 by wireless transmission, using the 2.4 GHz band. At the same time, the control data is transmitted and received between the transmitting device 100 and the wireless television receiver 200 within the same frequency range.

B-2. Configuration of Wireless Television Receiver 200

Figure 15:
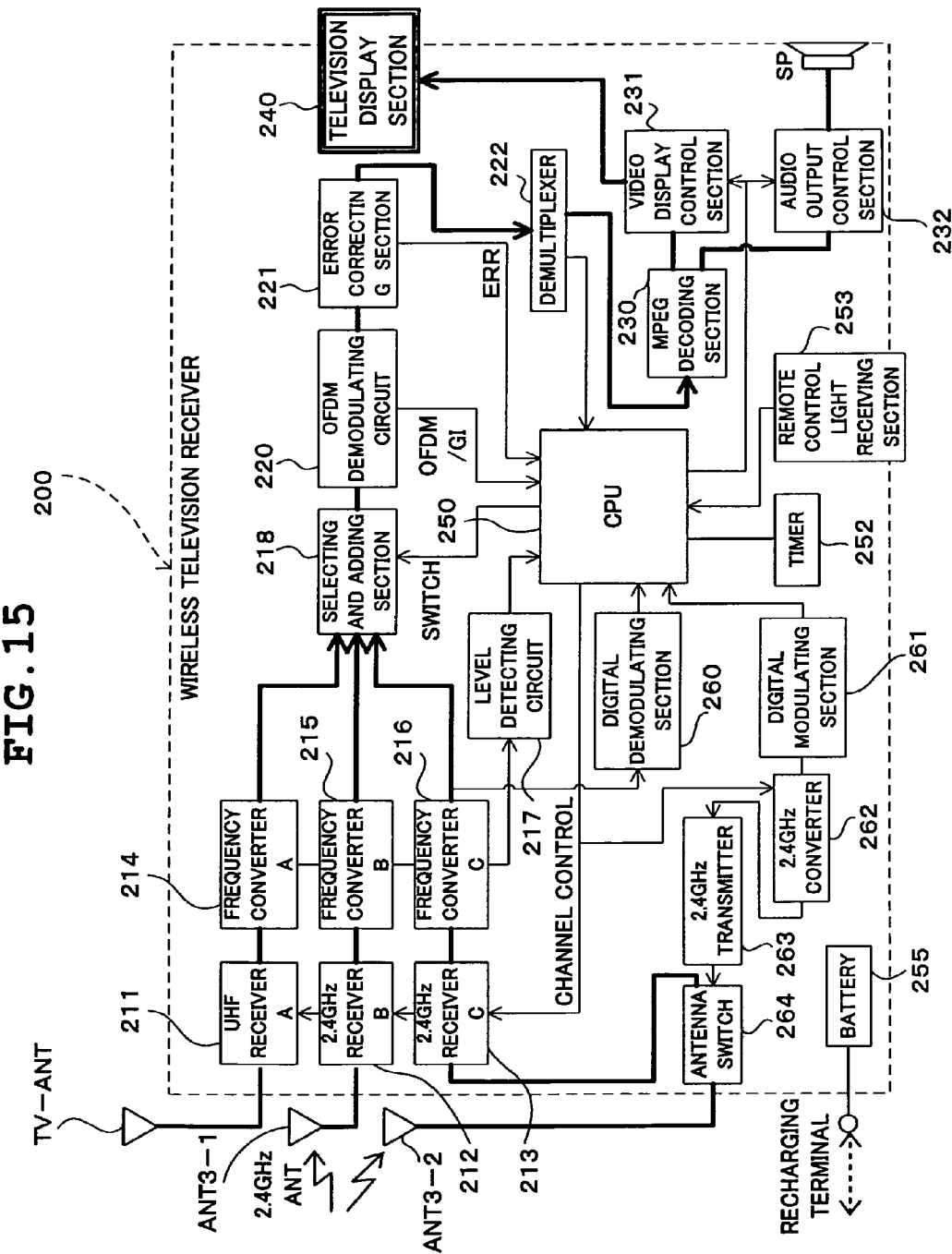
FIG. 15 is a block diagram showing a configuration of the wireless television receiver 200 according to the second embodiment.

Next, a configuration of the wireless television receiver 200 according to the second embodiment will be explained, with reference to FIG. 15 to FIG. 17. FIG. 15 is a block diagram showing the configuration of the wireless television receiver 200 according to the second embodiment. In FIG. 15, the UHF receiver 211 directly receives a digital terrestrial broadcast of the reception channel based on the channel control signal provided by the CPU 250. The UHF receiver 211 receives the digital terrestrial broadcast via the antenna TV-ANT.

The 2.4 GHz receiver 212 receives the digital broadcast signal transmitted from the transmitting device 100 using the reception channel based on the channel control signal provided by the CPU 250. The 2.4 GHz receiver 212 receives the digital broadcast signal via the antenna ANT-3. The 2.4 receiver 213 receives the digital broadcast signal transmitted from the transmitting device 100 using the reception channel based on the channel control signal provided by the CPU 250. The 2.4 GHz receiver 213 receives the digital broadcast signal via an antenna switch 264 (described hereafter).

The intermediate frequency converters 214 to 216 convert the digital broadcast signals respectively received by and outputted from the UHF receiver 211 and the 2.4 GHz receivers 212 to 213 to an intermediate frequency (for example, 50 MHz to 56 MHz). Each digital broadcast signal outputted from the intermediate frequency converters 214 to 216 are provided to the selecting and adding section 218 in the next stage. At the same time, each digital broadcast signal is provided to the level detecting circuit 217. The level detecting circuit 217 detects the respective output levels of the intermediate frequency converters 214 to 216 and performs an A/D conversion on the output levels. Then, the level detecting circuit 217 provides the CPU 250 with the output levels.

The CPU 250 compares each output level of the intermediate frequency converters 214 to 216, outputted from the level detecting circuit 217. Then, the CPU 250 provides the selecting and adding section 218 with the comparison results. The selecting and adding section 218 may select one wave from any one of the respective outputs from the IF converters 214 to 216, taking into consideration the level comparison results from the CPU 250 and the error rate values from the error correcting section 221, described hereafter, and output the selected wave. Alternatively, the selecting and adding section 218 may add any two waves or three waves and output the added waves.

The OFDM demodulating circuit 220 performs OFDM demodulation on the digital broadcast signal which has been converted to an intermediate frequency outputted from the selecting and adding section 218. The error correcting section 221 performs the Reed-Solomon error correction on the OFDM demodulated signal outputted from the OFDM demodulating circuit 220 and generates an MPEG-TS signal (transport stream signal). In addition, the error correcting section 221 sends the error rate ERR at the time of error correction to the CPU 250. The demultiplexer 222 separates and extracts the program packet (MPEG data) from the MPEG-TS (transport stream signal). The demultiplexer 222 provides the MPEG decoding section 230 with the separated and extracted program packet (MPEG data) and the CPU 250 with the data broadcast signal, such as that for text broadcasting.

The MPEG decoding section 230 decodes the program packet provided by the demultiplexer 222 to image data and audio data. Reference number 231 represents the video display control section. The video display control section 231 converts the image data decoded by the MPEG decoding section 230 to image signals and controls the television display section 240 to reproduce the image based on image signals. Reference number 232 represents the audio output control section. The audio output control section 232 converts the audio data decoded by the MPEG decoding section 230 to audio signals and output audio signals to speaker SP. The speaker SP reproduces the sound.

The CPU 250 controls each section within the receiver as described above, according to various control programs and control data stored in the memory (not shown). The timer 252 generates the timer clock required for the processes performed by the CPU 250. The remote control light receiving section 253 receives infrared communication data from the infrared remote control (not shown) and provides the CPU 250 with the infrared communication data.

The digital demodulating section 260 demodulates the intermediate frequency output from the intermediate frequency converter 216 and provides the CPU 250 with the extracted control data. The digital modulating section 261 performs digital modulation on the control data generated by the CPU 250 and outputs the acquired modulated signal to the 2.4 GHz converter 262. The 2.4 GHz converter 262 converts the modulated signal (control data) outputted from the digital modulating section 261 to the frequency of the predetermined channel of the 2.4 GHz band, specified by the CPU 250.

The 2.4 GHz transmitter 263 performs radio frequency amplification on the modulated signal outputted from the digital modulating section 261, as the transmission signal of the 2.4 GHz band. The 2.4 GHz transmitter 263 provides the antenna switch 264 with the signal. The antenna switch 264 switches between the transmission path and the reception path under the control of the CPU 250. In other words, the antenna switch 264 connects the output path from the 2.4 GHz transmitter 263 to the antenna ANT3-2 during transmission. The antenna switch 264 connects the ANT3-2 to the 2.4 GHz receiver 213 during reception.

In this way, in the wireless television receiver 200 according to the second embodiment, the control data is exchanged with the transmitting device 100 by wireless transmission, in place of the bidirectional communication interface 254 (see FIG. 9) provided in the first embodiment. Therefore, the wireless television receiver 200 according to the second embodiment includes the digital demodulating section 260, the digital modulating section 261, the 2.4 GHz converter 262, the 2.4 GHz transmitter 263, and the antenna switch 264.

Figure 16:
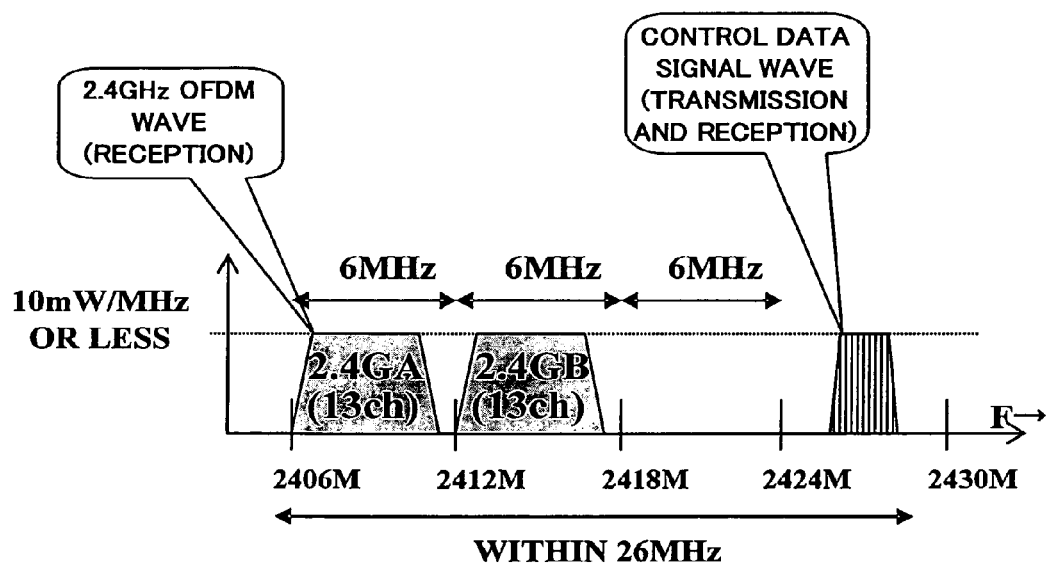
FIG. 16 is a diagram showing an example of a transmission and reception spectrum of the wireless television receiver 200 according to the second embodiment.
Figure 17:
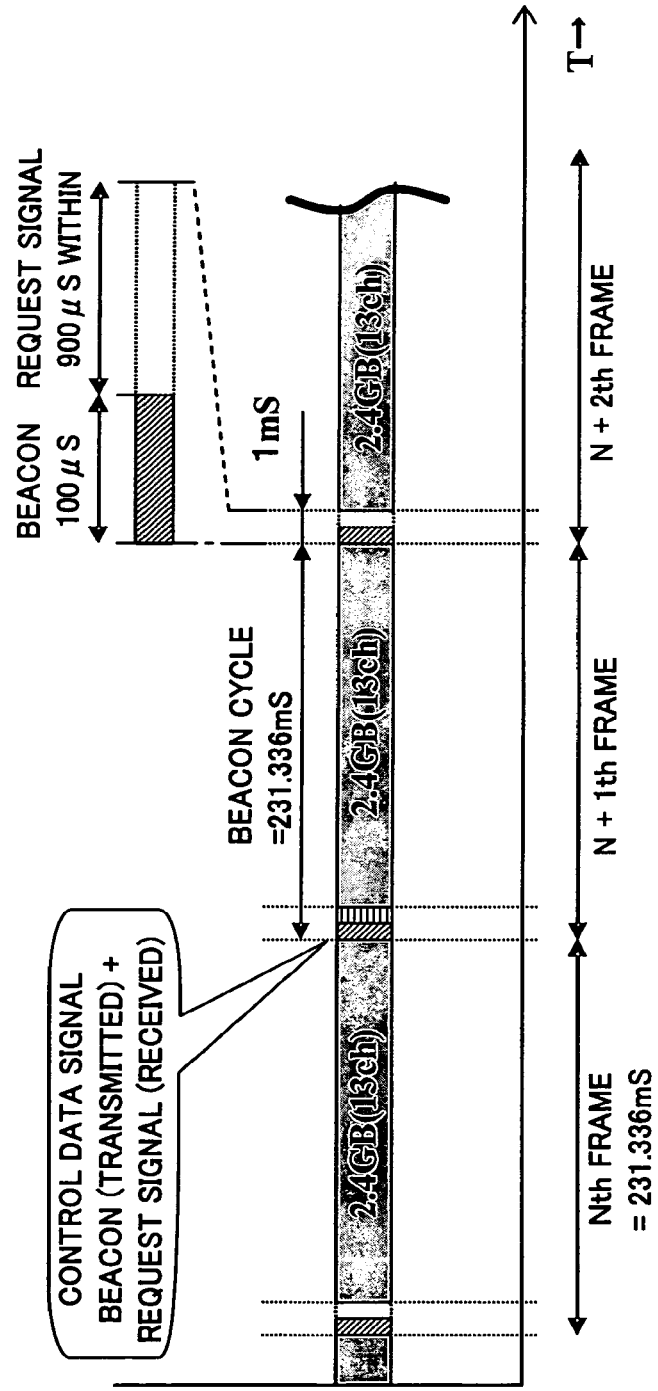
FIG. 17 is a diagram for explaining an overview of a wireless communication operation according to a third embodiment.

According to the above-described configuration, as is clear from the transmission and reception spectrum example shown in FIG. 16, the wireless television receiver 200 receives the digital broadcast signal (OFDM signal) transmitted by wireless transmission from the transmitting device 100 using the 2.4 GHz band. At the same time, the control data is transmitted and received between the transmitting device 100 and the wireless television receiver 200 within the same frequency range.

In the second embodiment, as in the transmission and reception spectrum example shown in FIG. 16, the control data is transmitted and received using a transmission channel differing from the channel used for digital broadcast signals (OFDM signal). However, such a range for transmitting and receiving control data may not secured because of changes in the assigned wireless range. In this case, a method for transmitting and receiving the control data using the same channel as the digital broadcast signal by time-division is effective. This method will be explained hereafter, as a third embodiment and a fourth embodiment.

C. Third Embodiment

Figure 18:
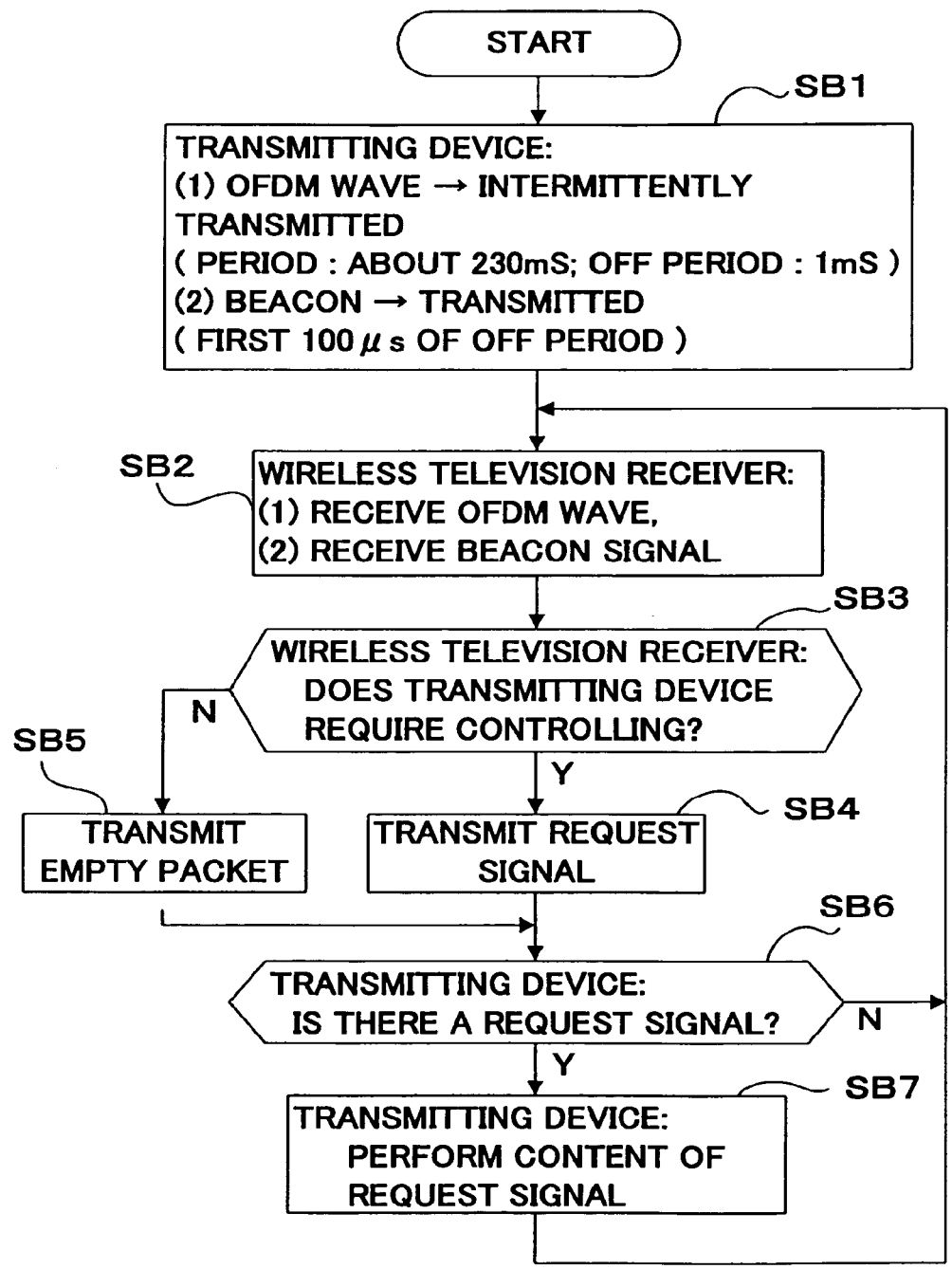
FIG. 18 is a flowchart for explaining the wireless communication operation performed between the transmitting device 100 and the wireless television receiver 200 according to a third embodiment.

Next, the third embodiment will be explained with reference to FIG. 17 to FIG. 18. The configuration according to the third embodiment is the same as that according to the second embodiment, described above. Therefore, explanations thereof are omitted. The wireless communication operation performed between the transmitting device 100 (see FIG. 13) and the wireless television receiver 200 (see FIG. 15) according to the third embodiment differs from that according to the second embodiment. Therefore, a wireless communication operation according to the third embodiment will be explained below.

First, an overview of the wireless communication operation will be explained with reference to FIG. 17. As shown in FIG. 17, the transmitting device 100 stops the transmission of a digital broadcast signal and transmits a beacon signal. The beacon signal indicates that the transmitting device 100 can receive a control signal from the wireless television receiver 200. Having received the beacon signal, the wireless television receiver 200 immediately transmits the control signal to the transmitting device 100. The control signal includes information such as television channel changes. In other words, the transmitting device 100 and the wireless television receiver 200 transmit and receive control data by time-division.

A control data transmission and reception period of, for example, 1 ms is provided for each frame of the digital broadcast signal. Within the frequency-division-multiplexed transmission signal, the digital broadcast signal is intermittently transmitted. The intermittent transmission is defined as to stop the digital broadcast signal from being sent during the control data transmission and reception period. At the same time, within the frequency-division-multiplexed transmission signal, the control data is transmitted during the control data transmission and reception period. In other words, the beacon signal is sent from the transmitting device 100 to the wireless television receiver 200 as control data, between the intermittent transmissions of the digital broadcast signal. Having received the beacon signal, the wireless television receiver 200 returns a request signal to the transmitting device 100. As a result, the communication between the transmitting device 100 and the wireless television receiver 200 can be established.

It is known that, in digital broadcast reception, the Reed-Solomon code can perform a burst error correction on eight symbols among 204 symbols per frame. Furthermore, convolution code can perform error corrections on random errors. Therefore, even when the intermittent transmission that stops the digital broadcast signal from being sent for about 1 ms during the control data transmission and reception period, image deterioration does not occur in the digital broadcast signal transmitted by wireless transmission from the transmitting device 100 to the wireless television receiver 200.

Next, the wireless communication operation performed between the transmitting device 100 and the wireless television receiver 200 will be explained, with reference to FIG. 18. First, Step SB1 is an operation performed by the transmitting device 100. At Step SB1, the transmitting device 100 intermittently transmits the digital broadcast signal (OFDM wave). In the intermittent transmission, transmitting device 100 stops the digital broadcast signal from being sent during the control data transmission and reception period. The intermittent transmission period is set to about 230 seconds. The OFF period (control data transmission and reception period) is set to 1 ms. The intermittent transmission period does not necessarily have to be synchronous with the frame period of the OFDM wave. In addition, at Step SB1, the transmitting device 100 transmits the control data (beacon signal), within the transmission signals, within the first 100 μs of the control data transmission and reception period.

Step SB2 to Step SB5 are performed by the wireless television receiver 200. At Step SB2, the wireless television receiver 200 receives the control data (beacon signal) and the digital broadcast signal (OFDM wave) transmitted by wireless transmission from the transmitting device 100. Next, at Step SB3, the wireless television receiver 200 determines whether the transmitting device 100 requires controlling (changes to television channels, etc.). If the transmitting device 100 requires controlling, the wireless television receiver 200 proceeds to Step SB4. At Step SB4, the wireless television receiver 200 transmits the request signal including information, such as the television channel the user wishes to view. If the transmitting device 100 does not require controlling, the wireless television receiver 200 proceeds to Step SB5 and transmits an empty packet.

Step SB6 to Step SB7 are operations performed by the transmitting device 100. At Step SB6, the transmitting device 100 judges whether the signal transmitted from the wireless television receiver 200 is a request signal or not. When the signal is not a request signal, the transmitting device 100 returns to Step SB2. When the signal is a request signal, the transmitting device 100 proceeds to Step SB7 and performs the instructed operation. For example, when the transmitting device 100 receives a television channel change request, the transmitting device 100 changes the television channel. After performing the content of the request signal, the transmitting device 100 returns to Step SB2. Subsequently, Step SB2 to Step SB7 are repeated. As a result, the wireless television receiver 200 can control the transmitting device 100.

As explained above, in the third embodiment, the control data transmission and reception period of, for example, 1 ms is provided for each frame of the digital broadcast signal. The digital broadcast signal is intermittently transmitted. In the intermittent transmission, the digital broadcast signal is stopped from being sent during the control data transmission and reception period. At the same time, the control data is transmitted during the control data transmission and reception period.

In other words, the beacon signal is sent from the transmitting device 100 to the wireless television receiver 200 as the control data, between the intermittent transmissions of the digital broadcast signals. Having received the beacon signal, the wireless television receiver 200 returns a request signal to the transmitting device 100. As a result, the communication between the transmitting device 100 and the wireless television receiver 200 is established. In the digital broadcast signal, error correction can be performed, even when an error of about 1 ms occurs per frame. Therefore, even when the intermittent transmission for stopping the digital broadcast signal from being sent during the control data transmission and reception period is performed, the digital broadcast signal can be transmitted from the transmitting device 100 to the wireless television receiver 200 by wireless transmission without the occurrence of image deterioration.

D. Fourth Embodiment

Figure 19:
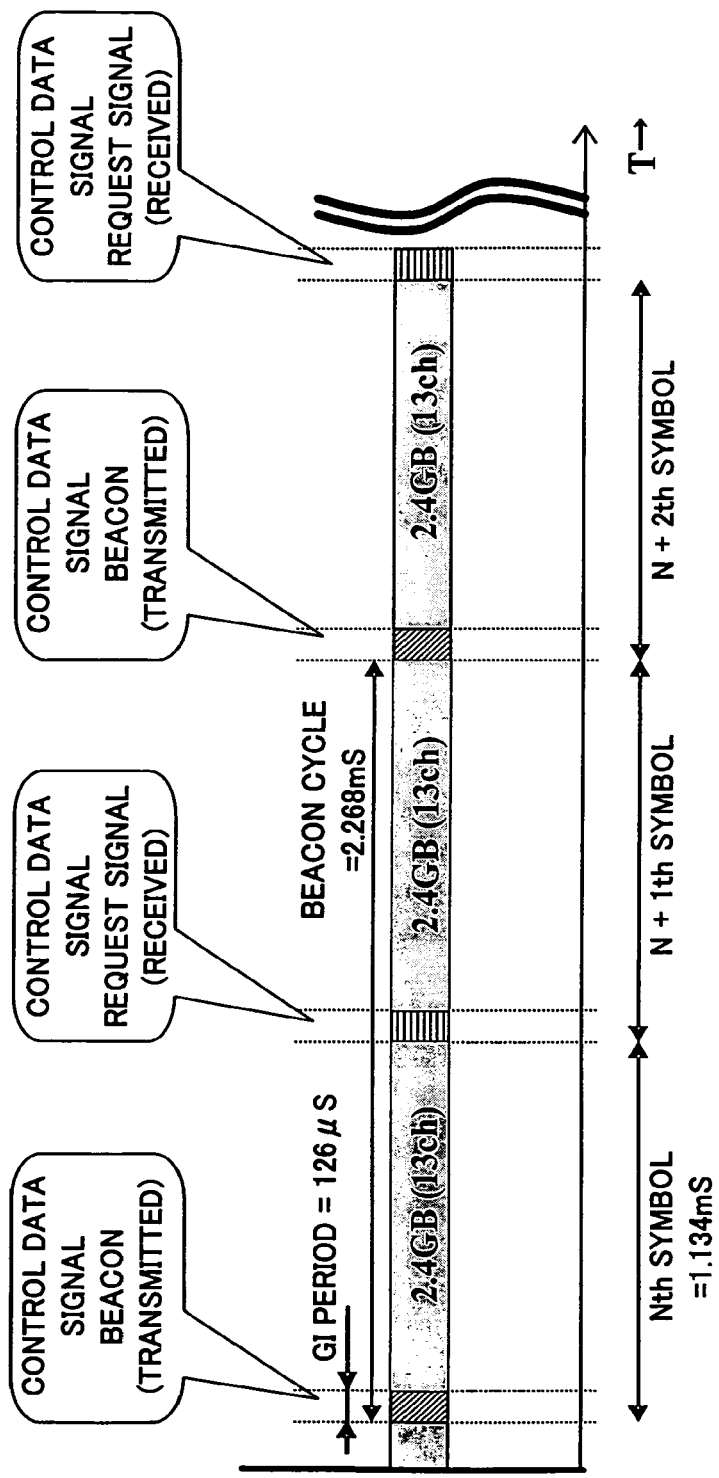
FIG. 19 is a diagram for explaining an overview of the wireless communication operation according to a fourth embodiment.
Figure 20:
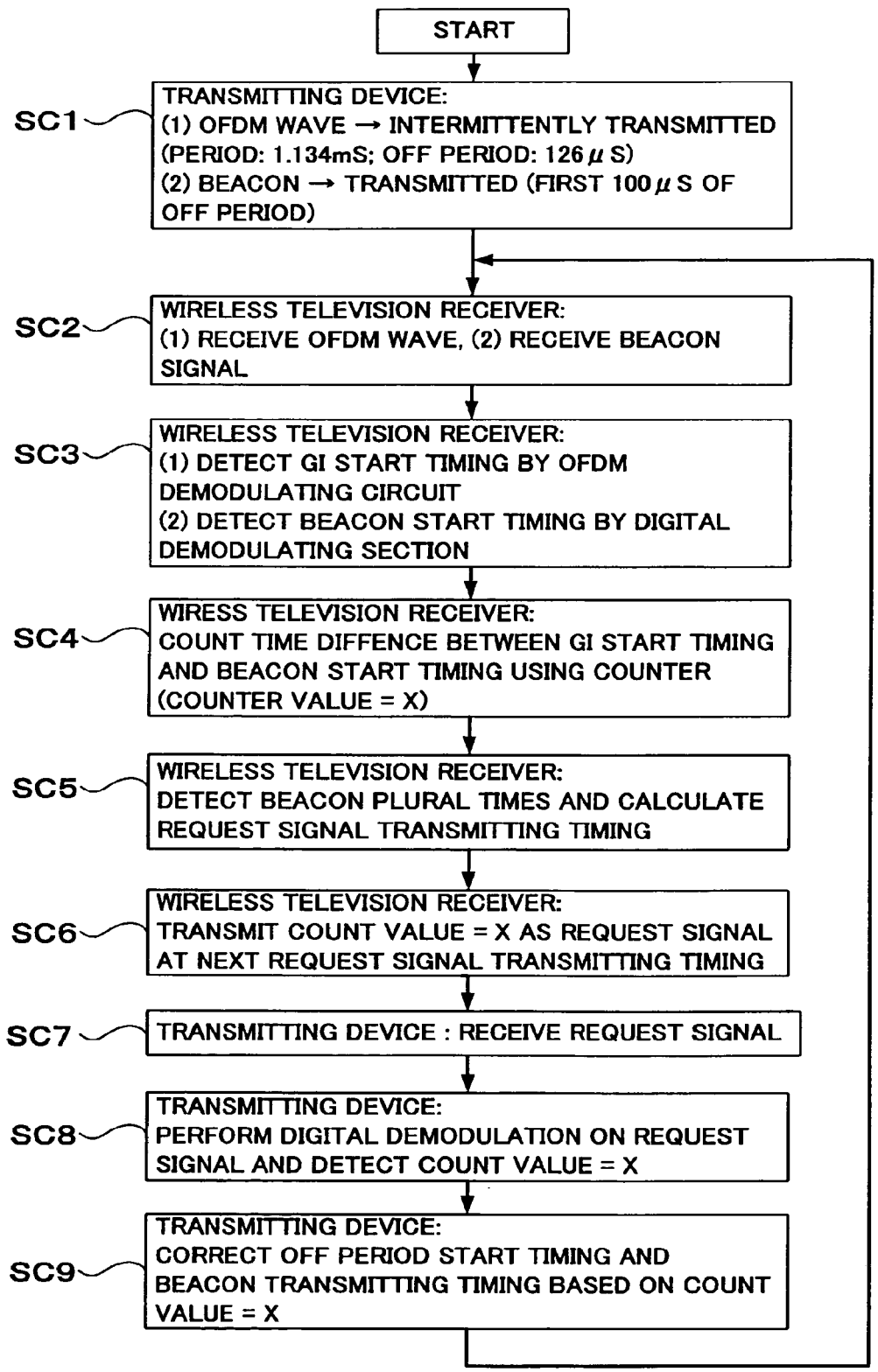
FIG. 20 is a flowchart for explaining the wireless communication operation according to the fourth embodiment.

Next, a fourth embodiment will be explained, with reference to FIG. 19 to FIG. 20. The configuration according to the fourth embodiment is the same as that according to the second embodiment. Therefore, explanations thereof are omitted. The wireless communication operation performed between the transmitting device 100 (see FIG. 13) and the wireless television receiver 200 (see FIG. 15) according to the fourth embodiment differs from that according to the second embodiment. Therefore, the wireless communication operation according to the fourth embodiment will be explained below. First, an overview of the wireless communication operation according to the fourth embodiment will be explained with reference to FIG. 19. As shown in FIG. 19, the transmitting device 100 performs time division multiplexing to roughly synchronize frequency-division-multiplexed transmission signals (the digital broadcast signals and control data of two channels) with the symbols of the digital broadcast signal. Then, the transmitting device 100 transmits the transmission signals by wireless transmission.

It is known that, in digital broadcast reception, a guard interval GI of about 126 μs is provided to cancel delay waves. When the digital broadcast signal is transmitted indoors by wireless transmission, only a guard interval period of about 1 μs is required. Therefore, at least 125 μs within the 126 μs guard interval GI for the digital broadcast wave (OFDM wave) are unnecessary. Thus, the guard interval GI of the digital broadcast signal is set to the control data transmission and reception period.

The transmitting device 100 intermittently transmits the digital broadcast signal, within the transmission signal, to stop the digital broadcast signal from being sent during the control data transmission and reception period (guard interval GI). At the same time, the control data, within the transmission signal, is transmitted during the control data transmission and reception period (guard interval GI). In other words, the beacon signal is sent from the transmitting device 100 to the wireless television receiver 200 as control data, between the intermittent transmissions of the digital broadcast signals. Having received the beacon signal, the wireless television receiver 200 returns a request signal to the transmitting device 100 during the control data transmission and reception period (guard interval GI). As a result, the communication between the transmitting device 100 and the wireless television receiver 200 can be established without the occurrence of image deterioration.

Next, the wireless communication operation according to the fourth embodiment will be explained, with reference to FIG. 20. First, Step SC1 is an operation performed by the transmitting device 100. At Step SC1, the transmitting device 100 intermittently transmits the digital broadcast signal (OFDM wave), within the transmission signal, to stop the digital broadcast signal from being sent during the control data transmission and reception period. The intermittent transmission period is set to about 1.134 ms. The OFF period (the control data transmission and reception period) is set to 126 μs. The intermittent transmission period is not synchronous with the symbol period of the OFDM wave. In addition, at Step SC1, the transmitting device 100 transmits the control data (beacon signal), within the transmission signals, within the first 100 μs of the control data transmission and reception period.

Step SC2 to Step SC6 are operations performed by the wireless television receiver 200. At Step SC2, the wireless television receiver 200 receives the control data (beacon signal) and the digital broadcast signal (OFDM wave) transmitted by wireless transmission from the transmitting device 100. Next, at Step SC3, the wireless television receiver 200 detects the guard interval start timing by the OFDM demodulating circuit 220 and detects the beacon start timing by the digital demodulating section 260. Then, at Step SC4, the wireless television receiver 200 counts the time difference between the guard interval start timing and the beacon signal start timing. The count value of the counted time difference is set as X. At Step SC5, the wireless television receiver 200 detects the beacon signal plural times and calculates a request signal transmitting timing. At Step SC6, the wireless television receiver 200 transmits the count value X to the transmitting device 100 as the request signal at the next request signal transmitting timing.

Step SC7 to Step SC9 are operations performed by the transmitting device 100. At Step SC7, the transmitting device receives the request signal transmitted from the wireless television receiver 200 at Step SC6. Next, at Step SC8, the transmitting device demodulates the request signal and detects the count value X. At Step SC9, the transmitting device 100 corrects the OFF period start timing (start timing of the guard interval GI) and the beacon transmitting timing based on the demodulated count value X. Subsequently, Step SC2 to Step SC9 are repeated. As a result, the communication between the transmitting device 100 and the wireless television receiver 200 is established. The transmitting device 100 and the wireless television receiver 200 work together, and the OFF period and the beacon start timing that match the guard interval GI period of the OFDM wave are generated. FIG. 25 shows an example in which the OFF period converges on the guard interval GI period.

In this way, in the fourth embodiment, the guard interval GI of the digital broadcast signal is set to the control data transmission and reception period. The transmitting device 100 intermittently transmits the digital broadcast signal to stop the digital broadcast signal from being sent during the control data transmission and reception period (guard interval GI). At the same time, the control data is transmitted during the control data transmission and reception period (guard interval GI).

In other words, the beacon signal is sent from the transmitting device 100 to the wireless television receiver 200 as control data, between the intermittent transmissions of the digital broadcast signals. Having received the beacon signal, the wireless television receiver 200 returns a request signal to the transmitting device 100 during the control data transmission and reception period (guard interval GI). As a result, the communication between the transmitting device 100 and the wireless television receiver 200 can be established without the occurrence of image deterioration.

E. Fifth Embodiment

Figure 21:
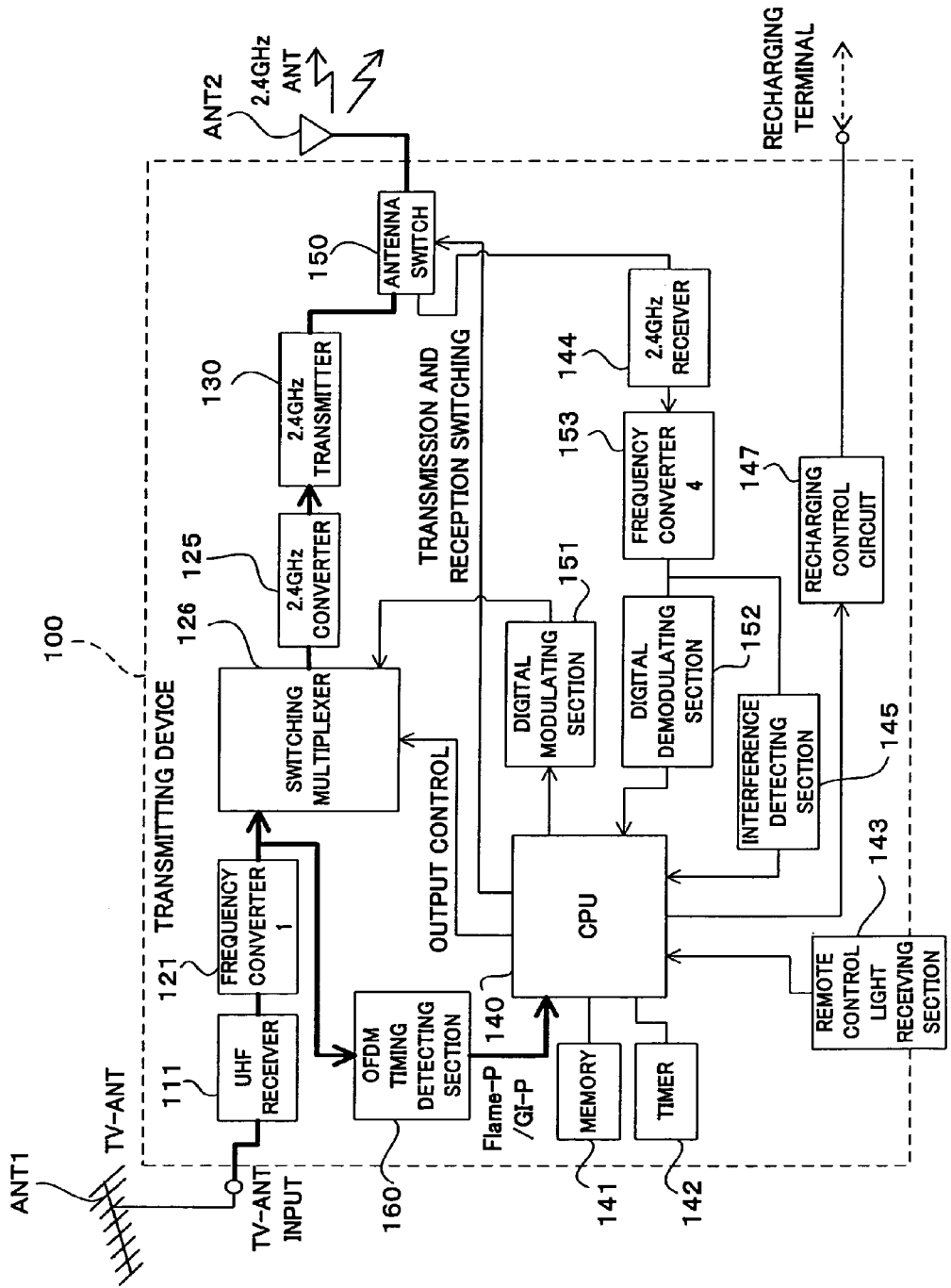
FIG. 21 is a block diagram showing a configuration of the transmitting device 100 according to a fifth embodiment.

Next, a fifth embodiment will be explained, with reference to FIG. 21 to FIG. 24. FIG. 21 is a block diagram of a configuration of the transmitting device 100 according to the fifth embodiment. In FIG. 21, the UHF receiver 111 receives the digital broadcast signal of the reception channel based on the channel control signal provided by the CPU 140. The UHF receiver 111 receives the digital broadcast signal via the outdoor antenna ANT1. The intermediate frequency converter 121 converts the digital broadcast signal outputted from the UHF receiver 111 to a predetermined intermediate frequency. When an output control signal (a) is provided by the CPU 140, a switching multiplexer 126 selects the modulated signal (control data) generated by the digital modulating section 151 and outputs the modulated signal to the next stage. In other instances, the switching multiplexer 126 outputs the digital broadcast signal from the intermediate frequency converter 121 to the next stage.

The 2.4 GHz converter 125 converts the modulated signal outputted from the switching multiplexer 126 to the frequency of a predetermined channel of the 2.4 GHz band specified by the CPU 140. The 2.4 GHz transmitter 130 in the following stage performs radio frequency amplification on the signal outputted from the 2.4 GHz transmitter 125, under the control of the CPU 140. The 2.4 GHz transmitter 130 transmits the amplified signal by wireless transmission from the transmission antenna ANT2 as the transmission signal of the predetermined channel of the 2.4 GHz band. The CPU 140 controls each section within the device according to various control programs and control data stored in the memory 141.

The timer 142 generates the timer clock required for the processes performed by the CPU 140. The remote control light receiving section 143 receives infrared communication data from the infrared remote control (not shown) and provides the CPU 140 with the infrared communication data. When the wireless television receiver 200 is mounted to the transmitting device 100, the recharging control circuit 147 recharges the battery in the wireless television receiver 200, via the recharging terminal. The antenna switch 150 switches between the transmission path and the reception path based on a switch control signal (a) provided by the CPU 140. In other words, the antenna switch 150 connects the output path from the 2.4 GHz transmitter 130 to the antenna ANT2 during transmission. The antenna switch 150 connects the antenna ANT2 to the 2.4 GHz receiver 144 during reception. The 2.4 GHz receiver 144 receives the control data transmitted by the wireless television receiver 200 using the predetermined channel of the 2.4 GHz band.

An intermediate frequency converter 153 converts the reception signal (control data) received by the 2.4 GHz receiver 144 to an intermediate frequency corresponding to a channel specified by the CPU 140. Then, the intermediate frequency converter 153 provides the reception signal to a digital demodulating section 152 and the interference detecting section 145 in the next stage. The digital demodulating section 152 demodulates the intermediate frequency signal outputted from the intermediate frequency converter 153 and provides the CPU 140 with the extracted control data. The interference detecting section 145 detects an interference wave level based on the interference frequency signal outputted from the intermediate frequency converter 153.

The digital modulating section 151 performs digital modulation on the control data generated by the CPU 140. The digital modulating section 151 provides the multiplexer 124 with the obtained modulated signal. The OFDM timing detecting section 160 detects the frame timing Frame-P or the guard interval timing GI-P from the output (OFDM wave) of the intermediate frequency converter 121 and provides the CPU 140 with the detected frame timing Frame-P or the guard interval timing GI-P.

In the transmitting device 100 configured as described above, digital broadcast signals, within the frequency-division-multiplexed transmission signals (digital broadcast signals and control data), are intermittently transmitted according to the frame timing Frame-P generated by the OFDM timing detecting section 160 or the guard interval timing GI-P generated by the OFDM timing detecting section 160. At the same time, the control data is transmitted to and received from the wireless television receiver 200 between the intermittent transmissions. As a result, the transmitting device 100 can perform wireless data communication with the wireless television receiver 200 without the occurrence of image deterioration. The wireless television receiver according to the fifth embodiment has the same configuration as that in the second embodiment (see FIG. 15). Therefore, explanations thereof are omitted.

Figure 23:
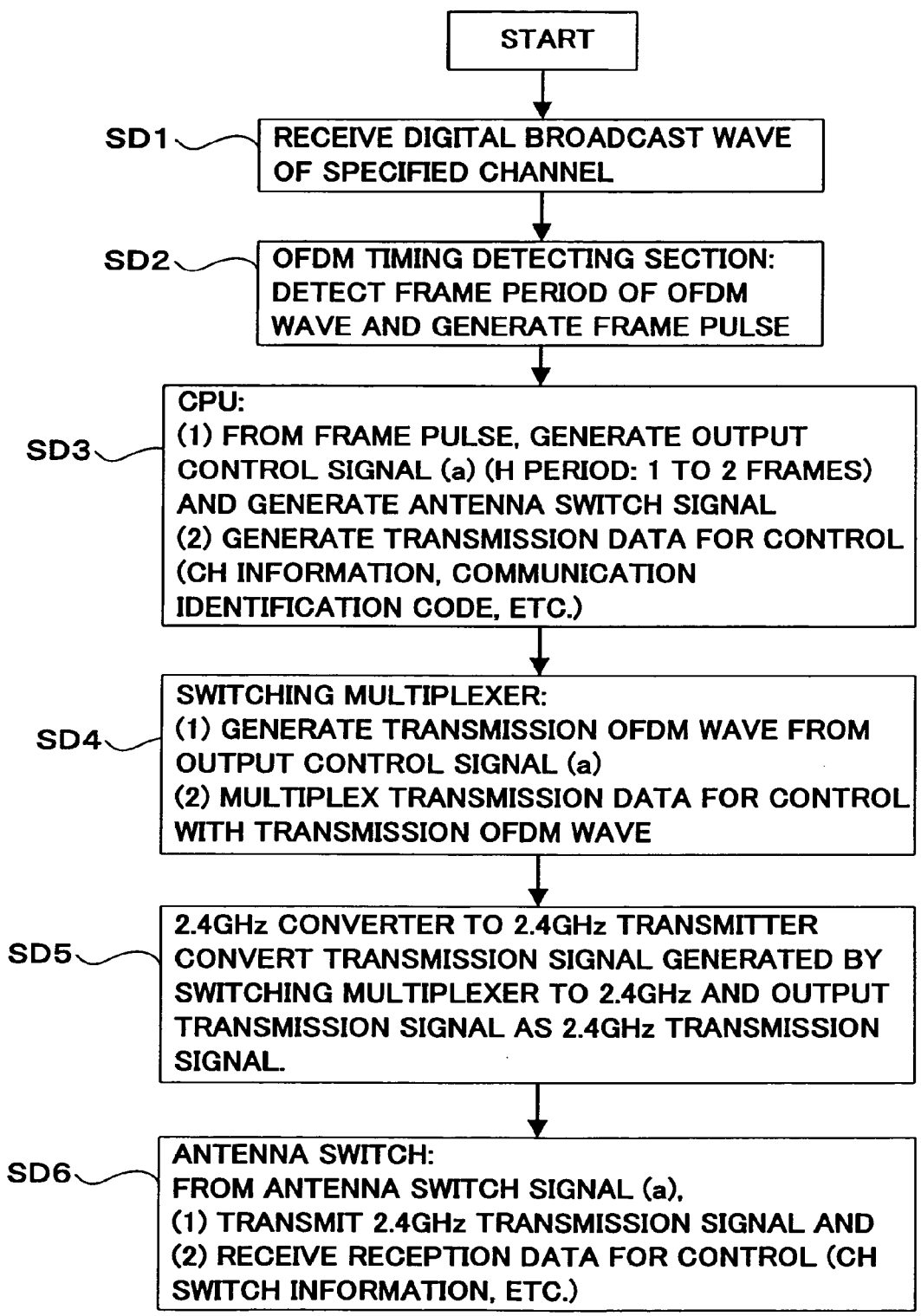
FIG. 23 is a flowchart for explaining the intermittent transmission and reception operation based on the frame timing Frame-P performed by the transmitting device 100 according to the fifth embodiment.
Figure 24:
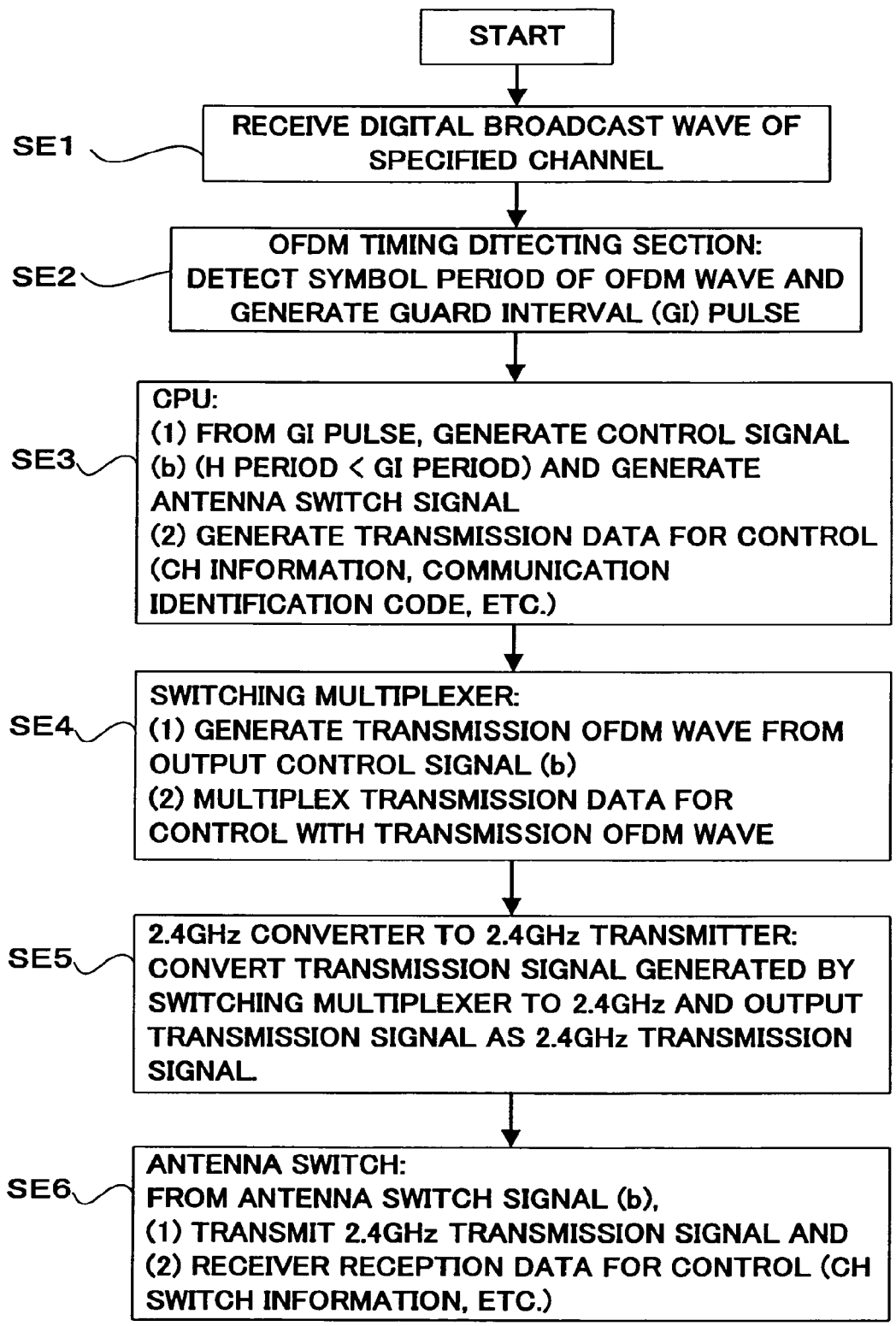
FIG. 24 is a flowchart for explaining the intermittent transmission and reception operation based on the guard interval timing GI-P performed by the transmitting device 100 according to the fifth embodiment.

Next, an intermittent transmission operation based on the frame timing Frame-P or the guard interval timing GI-P will be explained, with reference to FIG. 22 to FIG. 24. Hereafter, the explanations are separated into the intermittent transmission operation based on the frame-timing Frame-P and the intermittent transmission operation based on the guard interval timing GI-P.

<Intermittent Transmission Operation Based on Frame Timing Frame-P>

An intermittent transmission and reception operation based on the frame timing Frame-P will be explained, with reference to FIG. 22A and FIG. 23. First, at Step SD1, shown in FIG. 23, the transmitting device 100 receives a digital broadcast wave of a specified channel. Next, at Step SD2, the OFDM timing detecting section 160 detects the frame timing Frame-P from the digital broadcast signal (OFDM wave) outputted from the intermediate frequency converter 121, while the digital broadcast wave of the specified channel is being received. In addition, the OFDM timing detecting section 160 generates a frame pulse (see FIG. 22A) and provides the CPU 140 with the frame pulse.

Next, at Step SD3, the CPU 140 generates an output control signal (a) that is synchronous with the frame timing Frame-P. As shown in FIG. 22A, the output control signal (a) has an OFF period (period during which the transmission of the digital broadcast signal is stopped) equivalent to the length of one to two symbols. The transmission of the digital broadcast signal is stopped during this period. In addition, at Step SD3, the control data (transmission data for control) and the switch control signal (a) are generated during the OFF period. The control data includes the identification code for communication, broadcast station selection information, 2.4 GHz channel information, received level information, interference wave information, and the like.

At Step SD4 to Step SD5, as shown in FIG. 22A, when the output control signal (a) is not provided to the switching multiplexer 126, or in other words, when it is not during the OFF period, the digital broadcast signal (OFDM wave) outputted from the intermediate frequency converter 121 is transmitted using the predetermined channel of the 2.4 GHz band. At the same time, when it is during the OFF period and the switching multiplexer 126 is provided with the output control signal (a), the switching multiplexer 126 selects the output from the digital modulating section 151, or in other words, selects the control data (transmission data for control). The control data includes the identification code for communication, broadcast station selection information, 2.4 GHz channel information, received level information, interference wave information, and the like. Then, the switching multiplexer 126 transmits the control data using the predetermined channel of the 2.4 GHz band.

At Step SD6, when the antenna switch 150 is not provided with the switch control signal (a), or in other words, when it is not the OFF period, the output path of the 2.4 GHz transmitter 130 is connected to the antenna ANT2 and the transmission operation is performed. At the same time, when the CPU 140 provides the switch control signal (a) to the antenna switch 150 after the transmission of the control data, the antenna switch 150 connects the antenna ANT2 to the 2.4 GHz receiver 144 and receives the control data (channel switch information, etc.) from the wireless television receiver 200.

<Intermittent Transmission Operation according to Guard Interval Timing GI-P>

An intermittent transmission and reception operation according to the guard interval timing GI-P will be explained, with reference to FIG. 22B and FIG. 24. At Step SE1 shown in FIG. 24, the transmitting device 100 receives the digital broadcast wave of a specified channel. Next, at Step SE2, the OFDM timing detecting section 160 detects the guard interval timing GI-P from the digital broadcast signal (OFDM wave) outputted from the intermediate frequency converter 121, while the digital broadcast wave of the specified channel is being received. The OFDM timing detecting section 160 generates a GI pulse (see FIG. 22B) and provides the CPU 140 with the GI pulse.

Next, at Step SE3, the CPU 140 generates an output control signal (b) that is synchronous with the guard interval timing GI-P. As shown in FIG. 22B, the output control signal (b) has an OFF period (a period during which the transmission of the digital broadcast signal is stopped) that is shorter than the guard interval period. The transmission of the digital broadcast signal is stopped during this period. In addition, at Step SE3, the control data (transmission data for control) and the switch control signal (a) are generated during the OFF period. The control data includes the identification code for communication, broadcast station selection information, 2.4 GHz channel information, received level information, interference wave information, and the like.

At Step SE4 to Step SE5, as shown in FIG. 22B, when the output control signal (b) is not provided to the switching multiplexer 126, or in other words, when it is not during the OFF period, the digital broadcast signal (OFDM wave) outputted from the intermediate frequency converter 121 is transmitted using the predetermined channel of the 2.4 GHz band. At the same time, during the OFF period when the switch control signal (b) is not provided to the antenna switch 150 within the OFF period when the switching multiplexer 126 is provided with the output control signal (b), the switching multiplexer 126 selects the output from the digital modulating section 151, or in other words, selects the control data (transmission data for control). The control data includes the identification code for communication, broadcast station selection information, 2.4 GHz channel information, received level information, interference wave information, and the like. Then, the switching multiplexer 126 transmits the control data using the predetermined channel of the 2.4 GHz band.

At Step SE6, when the antenna switch 150 is not provided with the switch control signal (b), or in other words, when it is not the OFF period, the output path of the 2.4 GHz transmitter 130 is connected to the antenna ANT2 and the transmission operation is performed. At the same time, when the CPU 140 provides the switch control signal (b) to the antenna switch 150, the antenna switch 150 connects the antenna ANT2 to the 2.4 GHz receiver 144 and receives the control data (channel switch information, etc.) from the wireless television receiver 200.

As described above, in the fifth embodiment, the digital broadcast signal, within the frequency-division-multiplexed transmission signals (digital broadcast signal and control data), is intermittently transmitted based on the frame timing Frame-P generated by the OFDM timing detecting section 160 or the guard interval timing GI-P generated by the OFDM timing detecting section 160. The control data is transmitted to and received from the wireless television receiver 200, between the intermittent transmissions. Therefore, the digital broadcast signal can be transmitted to the wireless television receiver 200 by wireless transmission without the occurrence of image deterioration.

F. Modified Example

Figure 27:
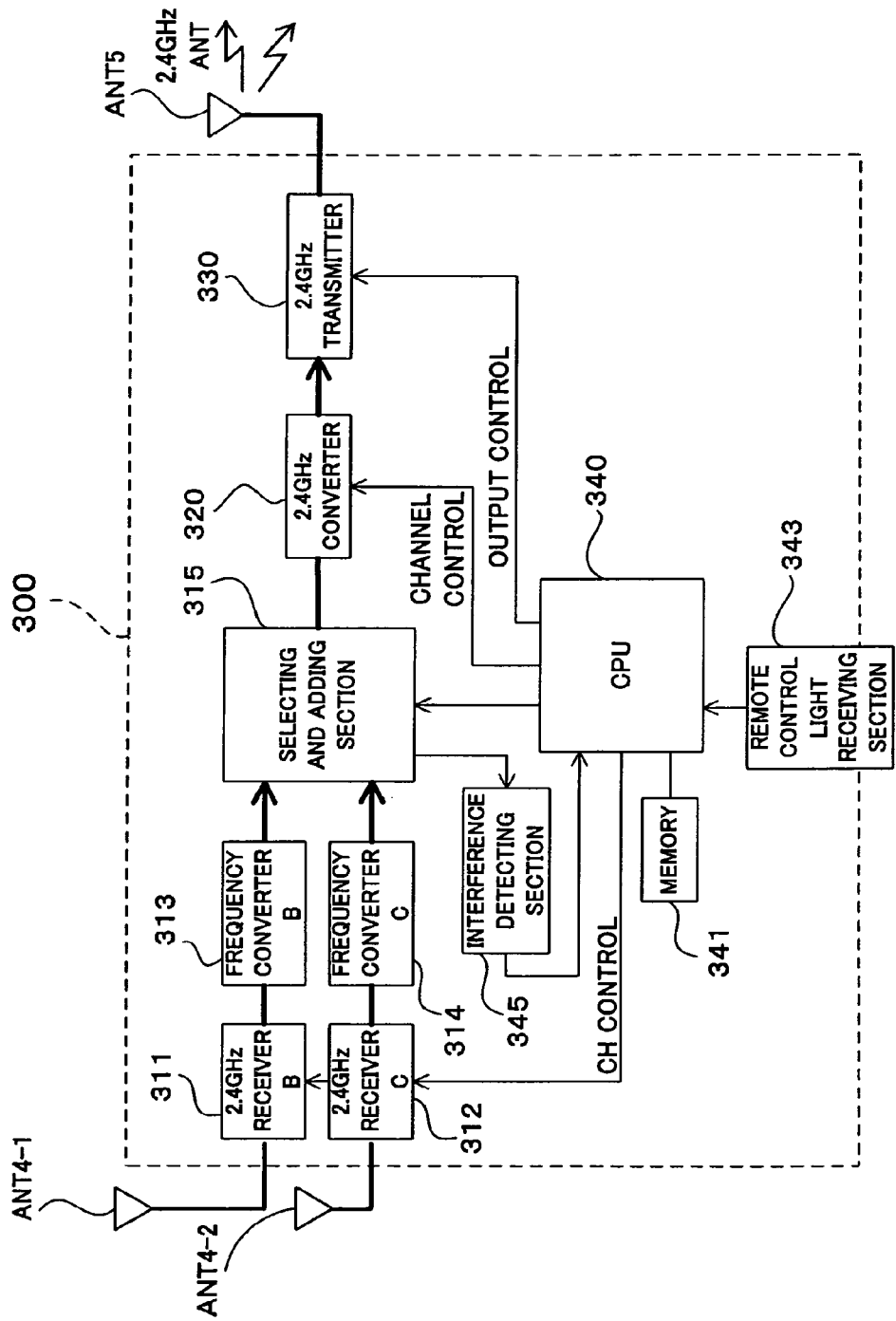
FIG. 27 is a block diagram showing a configuration of the retransmitting device 300 according to the modified example.

Next, a modified example of the present invention will be explained with reference to FIG. 26 to FIG. 28. FIG. 26 is a diagram showing a configuration of the wireless television system according to the modified example. As shown in FIG. 26, in the modified example, a retransmitting device 300 is provided between the transmitting device 100 and the wireless television receiver 200 characterized in that the reception range of the wireless television receiver 200 is widened. FIG. 27 is a block diagram of a configuration of the retransmitting device 300.

In FIG. 27, UHF receivers 311 to 312 receive digital broadcast signals of the reception channel based on the channel control signal provided by a CPU 340. The UHF receivers 311 to 312 receive the digital broadcast signals via antennas ANT4-1 to ANT4-2. Intermediate frequency converters 313 to 314 convert the digital broadcast signals respectively outputted from the UHF receivers 311 to 312 to predetermined intermediate frequencies.

A selecting and adding section 315 alternately selects each digital broadcast signal outputted from the intermediate frequency converters 313 to 314 based on an instruction from the CPU 250. Then, the selecting and adding section 315 provides an interference detecting section 345 with the selected digital broadcast signals. The interference detecting section 345 detects the signal level of each output of the intermediate frequency converter 313 to 314, outputted from the selecting and adding section 315. The CPU 340 registers the signal levels detected by the interference detecting section 345 in a memory 341. At the same time, the CPU 340 provides the selecting and adding section 315 with comparison results of the registered signal levels.

The selecting and adding section 315 selects any one of the respective outputs from the intermediate frequency converter 313 to 314, based on the level comparison results provided by the CPU 250 and outputs the selected wave to the next stage. Alternatively, the selecting and adding section 315 adds each output from the intermediate frequency converter 313 to 314 and outputs the added wave to the next stage. A 2.4 GHz converter 320 converts the output from the selecting and adding section 315 to the frequency of the predetermined channel of the 2.4 GHz band, specified by the CPU 250. A 2.4 GHz transmitter 330 performs radio frequency amplification on the output of the 2.4 GHz converter 320 and transmits the output by wireless transmission, via a transmission antenna ANT5.

Figure 28:
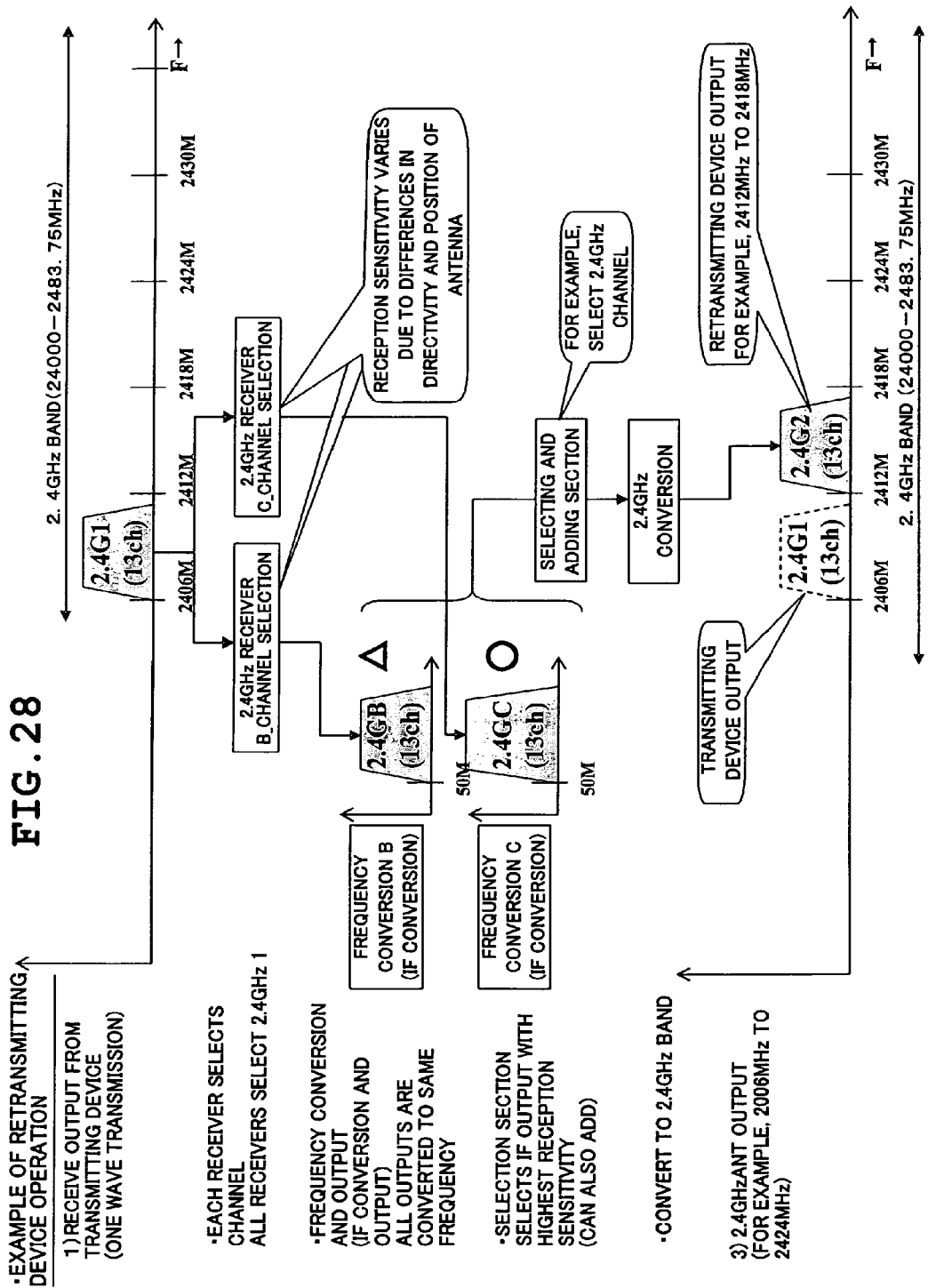
FIG. 28 is a diagram for explaining an overview of an operation performed by the retransmitting device 300 according to the modified example.

In the configuration above, for example, as shown in FIG. 28, both UHF receivers 311 to 312 receive the digital broadcast signals of channel 13 of the UHF band. Then, the intermediate frequency converters 313 to 314 convert the digital broadcast signals of channel 13 to intermediate frequencies IF1 to IF2. According to an instruction from the CPU 250, the selecting and adding section 315 alternately selects each digital broadcast signal outputted from the intermediate frequency converters 313 to 314 and provides the selected digital broadcast signals to the interference detecting section 345. The interference detecting section 345 alternately detects the signal levels of the digital broadcast signals and provides the CPU 340 with the detected signal levels. The CPU 340 provides the comparison results of the signal levels detected by the interference detecting section 345 to the selecting and adding section 315.

For example, as shown in FIG. 28, if the output level of the intermediate frequency converter 314 (the digital broadcast signal received by the 2.4 GHz receiver 312) is higher, the selecting and adding section 315 selects the digital broadcast signal outputted from the intermediate frequency converter 314 based on the level comparison results provided by the CPU 250. Then, the selecting and adding section 315 provides the 2.4 GHz converter 320 in the next stage with the selected digital broadcast signal. As a result, the digital broadcast signal with the highest received level is selected and retransmitted to the wireless television receiver 200.

While the present invention has been described with reference to the preferred embodiments, it is intended that the invention be not limited by any of the details of the description therein but includes all the embodiments which fall within the scope of the appended claims.

What is claimed is:

1. A wireless television system including a transmitting device that transmits by wireless transmission a digital broadcast signal obtained by receiving a digital broadcast and a wireless television receiver that receives the digital broadcast signal transmitted by wireless transmission, the wireless television system comprising:

a first broadcast receiving circuit, provided in the transmitting device, for receiving a predetermined number of channels from the digital broadcast having a plurality of channels;

a first frequency conversion circuit, provided in the transmitting device, for converting to an intermediate frequency each of digital broadcast signals corresponding to the predetermined number of channels which are outputted from the first broadcast receiving circuit;

a multiplexing circuit, provided in the transmitting device, for performing time division multiplexing of control data while frequency multiplexing each digital broadcast signal corresponding to the predetermined number of channels which are outputted from the first frequency conversion circuit;

a second frequency conversion circuit, provided in the transmitting device, for converting the output of the multiplexing circuit to a frequency used for a wireless Local Area Network which is outputted as a wireless Local Area Network signal;

a wireless transmission section, provided in the transmitting device, for generating wireless transmission of the wireless Local Area Network signal outputted from the second frequency conversion circuit;

a second broadcast receiving circuit, provided in the wireless television receiver, for directly receiving the digital broadcast;

a wireless Local Area Network receiving circuit, provided in the wireless television receiver, for receiving the digital broadcast signal which is carried by the wireless Local Area Network signal;

a third frequency conversion circuit, provided in the wireless television receiver, for converting the output of the second broadcast receiving circuit and the output of the wireless Local Area Network receiving circuit to an intermediate frequency;

a comparison circuit, provided in the wireless television receiver, for comparing a plurality of received levels or a plurality of error rates related to (i) a digital broadcast signal directly received by the second broadcast receiving circuit and (ii) digital broadcast signals received from the transmitting device via the wireless Local Area Network signal, corresponding to a same channel as that of the directly received digital broadcast signal among the digital broadcast signals outputted from the third frequency conversion circuit;

a selection circuit for selecting, based on a comparison result of the comparison circuit, a digital broadcast signal with a highest received level or a lowest error rate from among the plurality of digital broadcast signals of the same channel that have been subject to the comparison by the comparison circuit; and a demodulating circuit, provided in the wireless television receiver, for demodulating the digital broadcast signal from the output of the selection circuit.

2. The wireless television system according to claim 1, wherein the predetermined number is more than one and less than the plurality of channels.

3. The wireless television system according to claim 1, wherein the predetermined number is one.

4. The wireless television system according to claim 1, wherein the wireless television system is selectively operable in (i) a mode in which the predetermined number is one, and (ii) a mode in which the predetermined number is more than one and less than the plurality of channels.

* * * * *